US012656706B2

(12) United States Patent
Aoyagi

(10) Patent No.: US 12,656,706 B2
(45) Date of Patent: Jun. 16, 2026

(54) EXPOSURE APPARATUS AND IMAGE-FORMING APPARATUS

(71) Applicant: CANON KABUSHIKI KAISHA, Tokyo (JP)

(72) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/040,322

(22) Filed: Jan. 29, 2025

(65) Prior Publication Data

US 2025/0251676 A1 Aug. 7, 2025

(30) Foreign Application Priority Data

Feb. 1, 2024 (JP) ................................ 2024-014304

(51) Int. Cl.
*G03G 15/043* (2006.01)
*G03G 15/04* (2006.01)

(52) U.S. Cl.
CPC ..... *G03G 15/043* (2013.01); *G03G 15/04063* (2013.01); *G03G 2215/0412* (2013.01)

(58) Field of Classification Search
CPC ........... G03G 15/043; G03G 15/04054; G03G 2215/0412
See application file for complete search history.

(56) References Cited

U.S. PATENT DOCUMENTS 12,339,606 B2 * 6/2025 Aoyagi ................ G03G 15/505
2013/0155164 A1 * 6/2013 Kamei ............ G03G 15/04054 347/118
2022/0066351 A1 * 3/2022 Yoshida ............... G03G 15/043
2022/0342336 A1 * 10/2022 Horiuchi .......... G03G 15/04054

FOREIGN PATENT DOCUMENTS

JP 2022096965 A 6/2022

* cited by examiner

*Primary Examiner* — Jessica L Eley
(74) *Attorney, Agent, or Firm* — Canon U.S.A., Inc. IP Division

(57) ABSTRACT

An exposure apparatus includes a chip with light-emitting elements arranged along an axial direction of a photosensitive member; a generation unit that generates a first synchronization signal synchronized with a second synchronization signal corresponding to a rotation speed of the photosensitive member; and a transmission unit that transmits a data signal to the chip during a line cycle. The second synchronization signal indicates a first or second cycle depending on the rotation speed. The second cycle is N times the first cycle. The first synchronization signal indicates the first cycle regardless of the rotation speed. When the photosensitive member rotates at a slower second rotation speed, the data signal of one line is transmitted to the chip during one of N line cycles; and a non-light-emission signal is transmitted during the remaining cycle(s) of the N line cycles.

10 Claims, 18 Drawing Sheets

EXPOSURE APPARATUS AND IMAGE-FORMING APPARATUS

BACKGROUND

Field of the Disclosure

The present disclosure relates to an exposure apparatus and an image-forming apparatus.

Description of the Related Art

An electrophotographic image-forming apparatus forms an image by exposing a rotationally-driven photosensitive member with light to form an electrostatic latent image on it and developing the electrostatic latent image with toner. Among others, a solid-state exposure type exposure apparatus, that images light from a light-emitting element array onto a surface of a photosensitive member utilizing a rod lens array, is attracting attention because its downsizing, enhancing quietness, and cost reduction are easier compared to a laser-scanning type exposure apparatus.

Japanese Patent Laid-Open No. 2022-96965 discloses an example of an exposure apparatus of a solid-state exposure type. An image controller of the exposure apparatus in Japanese Patent Laid-Open No. 2022-96965 outputs a series of data signals for light emission control to a plurality of light-emitting chips, each of which has a light-emitting element array, during each line cycle indicated by a line synchronization signal. Each light-emitting chip drives a plurality of light-emitting elements in the light-emitting element array in accordance with the series of data signals input from the image controller.

SUMMARY

In general, in the case of an image-forming apparatus using an electrophotographic method, the amount of heat required to fix a toner image onto a sheet differs depending on the basis weight of the sheet. For example, the amount of heat required to sufficiently adhere toner to thick paper is greater than the amount of heat required to adhere toner to plain paper. Thus, when printing on thick paper, the process speed is usually made slower than when printing on plain paper, thereby ensuring the time to apply a sufficient amount of heat to the thick paper at a fixing unit.

However, when the light-emitting elements are maintained in a light-emitting state through one line cycle, as in the case of the exposure apparatus in Japanese Patent Laid-Open No. 2022-96965, if the process speed is set to be slow, the line cycle is lengthened accordingly, which may cause a photosensitive member to be exposed longer than necessary. Such excessive exposure can be prevented by causing the light-emitting elements to emit light only in a portion of a line cycle, but changing the manner of synchronization control in response to the process speed setting may result in circuit complication and increased costs.

In view of the foregoing issues, the present disclosure aims to provide a mechanism capable of preventing excessive exposure of a photosensitive member while avoiding complication of the circuit configuration.

According to an aspect, there is provided an exposure apparatus including: at least one light-emitting chip having a plurality of light-emitting elements arranged along a line parallel with an axial direction of a photosensitive member that is configured to rotate; a synchronization signal generation unit configured to generate a first synchronization signal synchronized with a second synchronization signal corresponding to a rotation speed of the photosensitive member, the first synchronization signal being used to control transmission of a data signal for each line to the at least one light-emitting chip; and a transmission unit configured to transmit, to the at least one light-emitting chip, a data signal of one line used for light emission control of the plurality of light-emitting elements, during a line cycle indicated by the first synchronization signal. The second synchronization signal indicates a first line cycle when the photosensitive member rotates at a first rotation speed, and indicates a second line cycle that is N times the first line cycle (N is an integer, $1<N$) when the photosensitive member rotates at a second rotation speed that is $1/N$ of the first rotation speed. The synchronization signal generation unit is configured to generate the first synchronization signal indicating the first line cycle regardless of the rotation speed of the photosensitive member, and when the photosensitive member rotates at the second rotation speed, the transmission unit is configured to: transmit the data signal of one line to the at least one light-emitting chip during one line cycle out of N line cycles indicated by the first synchronization signal; and transmit a non-light-emission signal for not causing the plurality of light-emitting elements to emit light to the at least one light-emitting chip during remaining one or more line cycles out of the N line cycles.

Further features of the present disclosure will become apparent from the following description of exemplary embodiments (with reference to the attached drawings).

DESCRIPTION OF THE EMBODIMENTS

Figure 1:
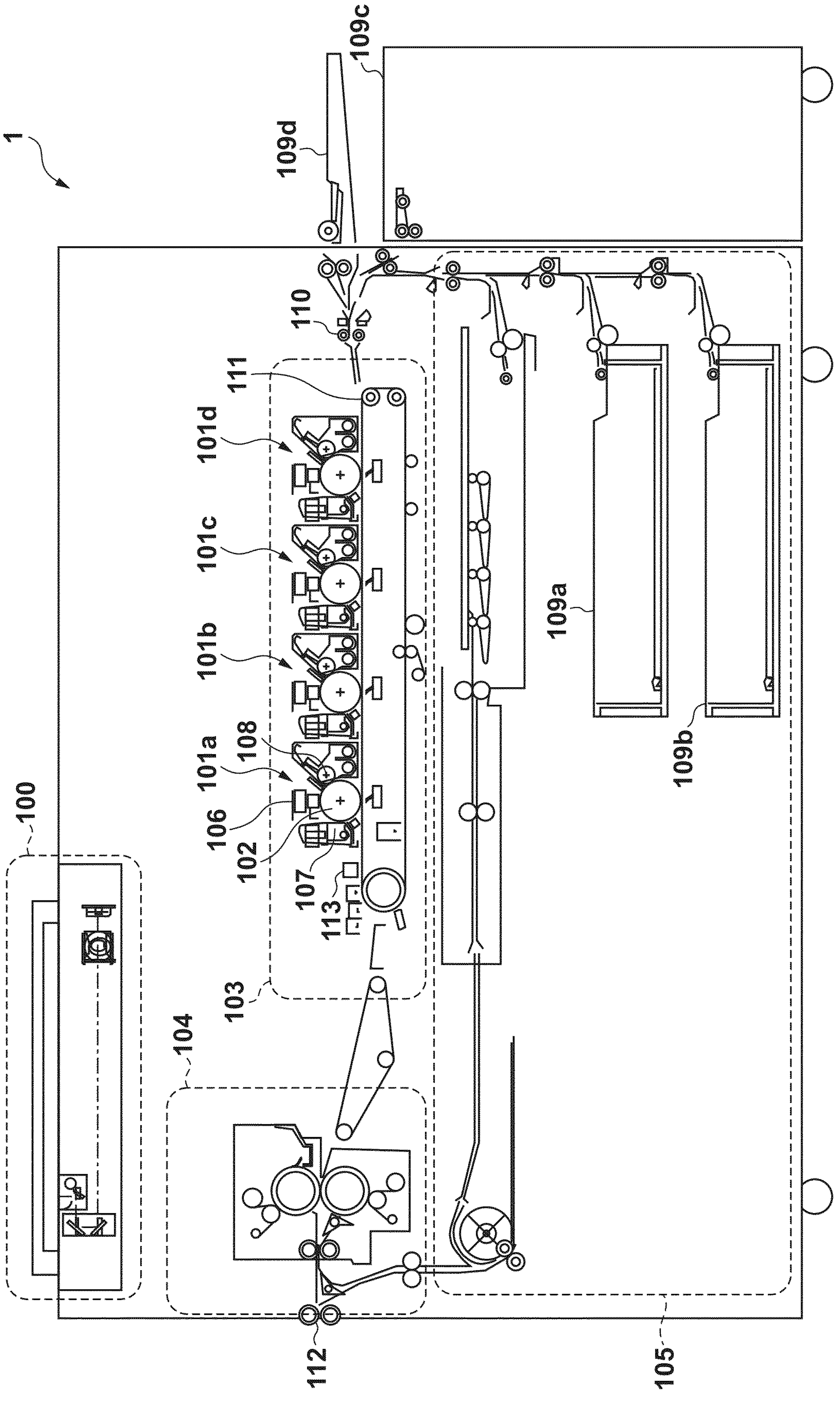
FIG. 1 is a configuration diagram showing a schematic configuration of an image-forming apparatus according to one or more aspects of the present disclosure.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

1. Schematic Configuration of Image-Forming Apparatus

FIG. 1 shows an example of a schematic configuration of an image-forming apparatus 1 according to an embodiment. The image-forming apparatus 1 includes a reading unit 100, an image-making unit 103, a fixing unit 104, and a transport unit 105. The reading unit 100 optically reads an original placed on a platen and generates read image data. The image-making unit 103 forms an image on a sheet based on the read image data generated by the reading unit 100 or based on print image data received from an external device via a network, for example.

The image-making unit 103 includes image-forming units 101*a*, 101*b*, 101*c*, and 101*d*. The image-forming units 101*a*, 101*b*, 101*c*, and 101*d* form toner images in black, yellow, magenta, and cyan, respectively. The image-forming units 101*a*, 101*b*, 101*c* and 101*d* have the same configuration, and are also referred to collectively as image-forming units 101 below. A photosensitive member 102 of the image-forming unit 101 is driven to rotate in the clockwise direction in the figure during image formation. A charger 107 electrically charges the photosensitive member 102. An exposure head 106 exposes the photosensitive member 102 with light to form an electrostatic latent image on a surface of the photosensitive member 102. A developer 108 develops the electrostatic latent image on the photosensitive member 102 with toner to form a toner image. The toner image formed on the surface of the photosensitive member 102 is transferred to a sheet that is being transported on a transfer belt 111. A color image containing four color components, namely black, yellow, magenta, and cyan can be formed by transferring the toner images of the four photosensitive members 102 to the sheet in a superimposed manner.

The transport unit 105 controls feed and transport of sheets. Specifically, the transport unit 105 feeds a sheet from a unit designated from among internal storage units 109*a* and 109*b*, an external storage unit 109*c*, and a manual feed unit 109*d* to a transport path in the image-forming apparatus 1. The fed sheet is transported to a registration roller 110. The registration roller 110 transports the sheet onto the transfer belt 111 at an appropriate timing such that the toner image of each photosensitive member 102 is transferred to the sheet. As mentioned above, the toner images are transferred to the sheet while the sheet is transported on the transfer belt 111. The fixing unit 104 fixes the toner images to the sheet by heating and pressurizing the sheet to which the toner images have been transferred. After the toner images have been fixed, the sheet is discharged to outside the image-forming apparatus 1 by a discharge roller 112. An optical sensor 113 is located at a position facing the transfer belt 111. The optical sensor 113 optically reads a test chart formed on the transfer belt 111 by the image-forming units 101. In a case where an error in an image-forming range is detected for the test chart read by the optical sensor 113, an image controller 710 described below performs control for compensating for the error when executing subsequent jobs.

Although an example in which the toner image is directly transferred from each photosensitive member 102 to the sheet on the transfer belt 111 has been described here, the toner image may alternatively be transferred indirectly from each photosensitive member 102 to the sheet via an intermediate transfer member. Further, although an example of forming a color image using toner of multiple colors has been described here, the technology according to the present disclosure is also applicable to an image-forming apparatus that forms a monochrome image using toner of a single color.

2. Configuration Example of Exposure Head

Figure 2A:
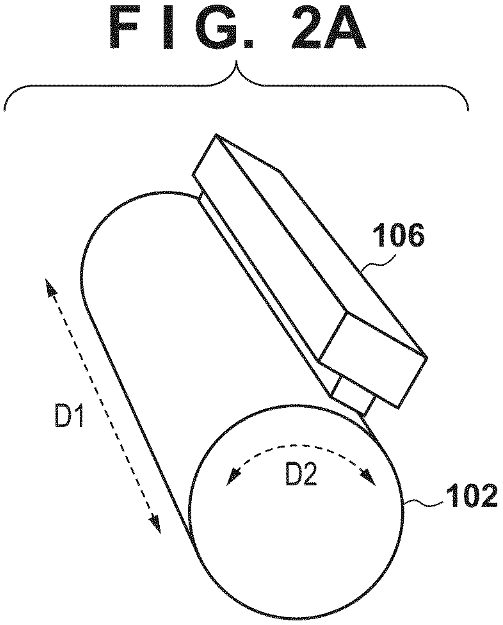
FIG. 2A is a first illustrative diagram of a configuration of a photosensitive member and an exposure head according to one or more aspects of the present disclosure.
Figure 2B:
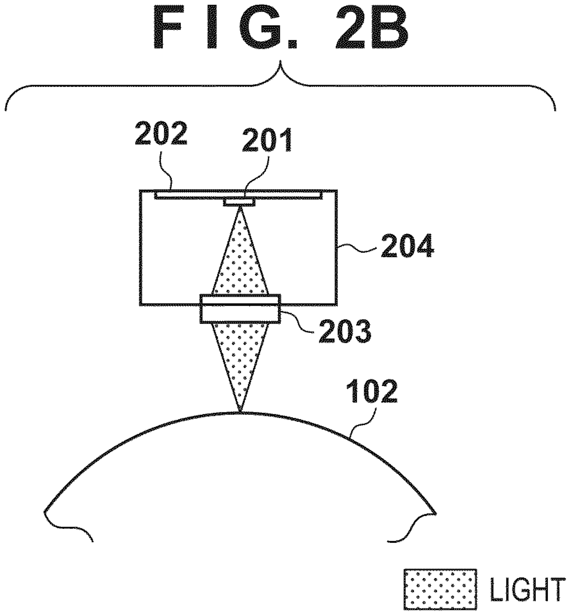
FIG. 2B is a second illustrative diagram of the configuration of the photosensitive member and the exposure head according to one or more aspects of the present disclosure.

FIGS. 2A and 2B show the photosensitive member 102 and the exposure head 106. The exposure head 106 includes a light-emitting element array 201, a printed circuit board 202 on which the light-emitting element array 201 is mounted, a rod lens array 203, and a housing 204 supporting the printed circuit board 202 and the rod lens array 203. The photosensitive member 102 has a cylindrical shape. The exposure head 106 is arranged such that the longitudinal direction thereof is parallel to an axial direction D1 of the photosensitive member 102, and a face of the exposure head 106 to which the rod lens array 203 is attached faces the surface of the photosensitive member 102. While the photosensitive member 102 rotates in a circumferential direction D2, the light-emitting element array 201 of the exposure head 106 emits light, and the rod lens array 203 images the light onto the surface of the photosensitive member 102.

Figure 3A:
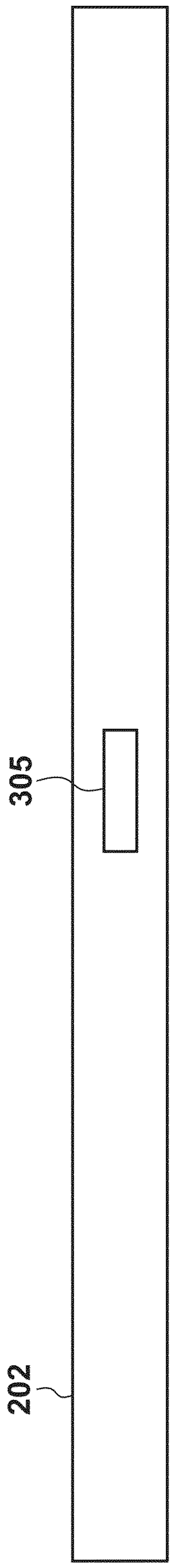
FIG. 3A is a first illustrative diagram of a configuration of a printed circuit board of the exposure head according to one or more aspects of the present disclosure.
Figure 3B:
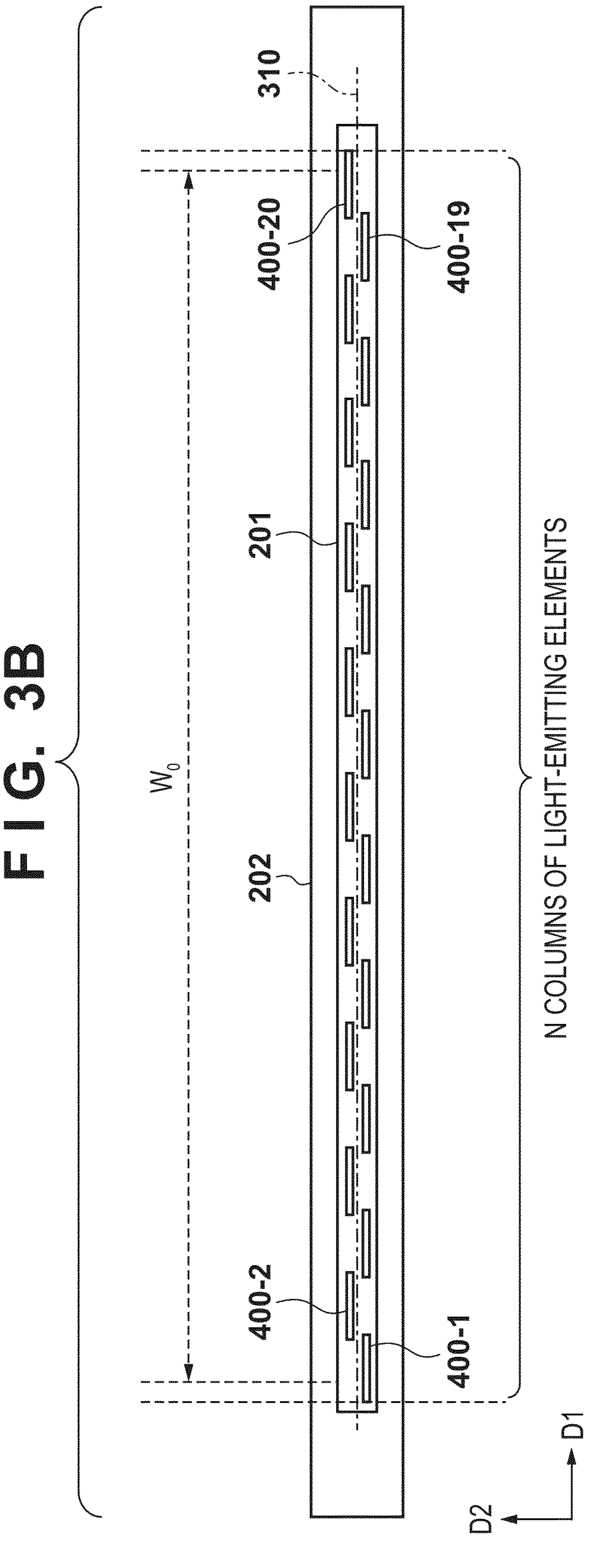
FIG. 3B is a second illustrative diagram of the configuration of the printed circuit board of the exposure head according to one or more aspects of the present disclosure.

FIGS. 3A and 3B show an example of a configuration of the printed circuit board 202. Note that FIG. 3A shows a face on which a connector 305 is mounted, and FIG. 3B shows a face on which the light-emitting element array 201 is mounted (a face on the side opposite to the face on which the connector 305 is mounted).

In the present embodiment, the light-emitting element array 201 has a plurality of light-emitting elements that are arranged two-dimensionally. The light-emitting element array 201 as a whole includes light-emitting elements in N columns in the axial direction D1 and M rows in the circumferential direction D2 of the photosensitive member, where M and N are integers no less than two. In the example of FIG. 3B, the light-emitting element array 201 is constituted by separate twenty light-emitting chips 400-1 to 400-20, each of which includes a subset of the entire plurality of light-emitting elements. The light-emitting chips 400-1 to 400-20 are arranged in a staggered manner along a reference line 310 that is parallel to the axial direction D1. The light-emitting chips 400-1 to 400-20 are also referred to collectively as light-emitting chips 400. As illustrated in FIG. 3B, the range occupied by the entire light-emitting elements of the twenty light-emitting chips in the axial direction D1 is wider than the range occupied by the maximum width $W_0$ of input image data. Accordingly, some light-emitting elements located at both ends in the axial direction D1 may not be used for exposing the photosensitive member 102 unless an error in the image-forming range is detected. Each light-emitting chip 400 on the printed circuit board 202 is connected to the image controller 710 (FIG. 6) via the connector 305. In the following, there are cases where the smaller branch number side of the light-emitting chips 400-1 to 400-20 arranged in the axial direction D1 is referred to as "left" and the larger branch number side as "right", for convenience of description. For example, the light-emitting chip 400-1 is a light-emitting chip 400 at the left end, and the light-emitting chip 400-20 is a light-emitting chip at the right end.

Figure 4:
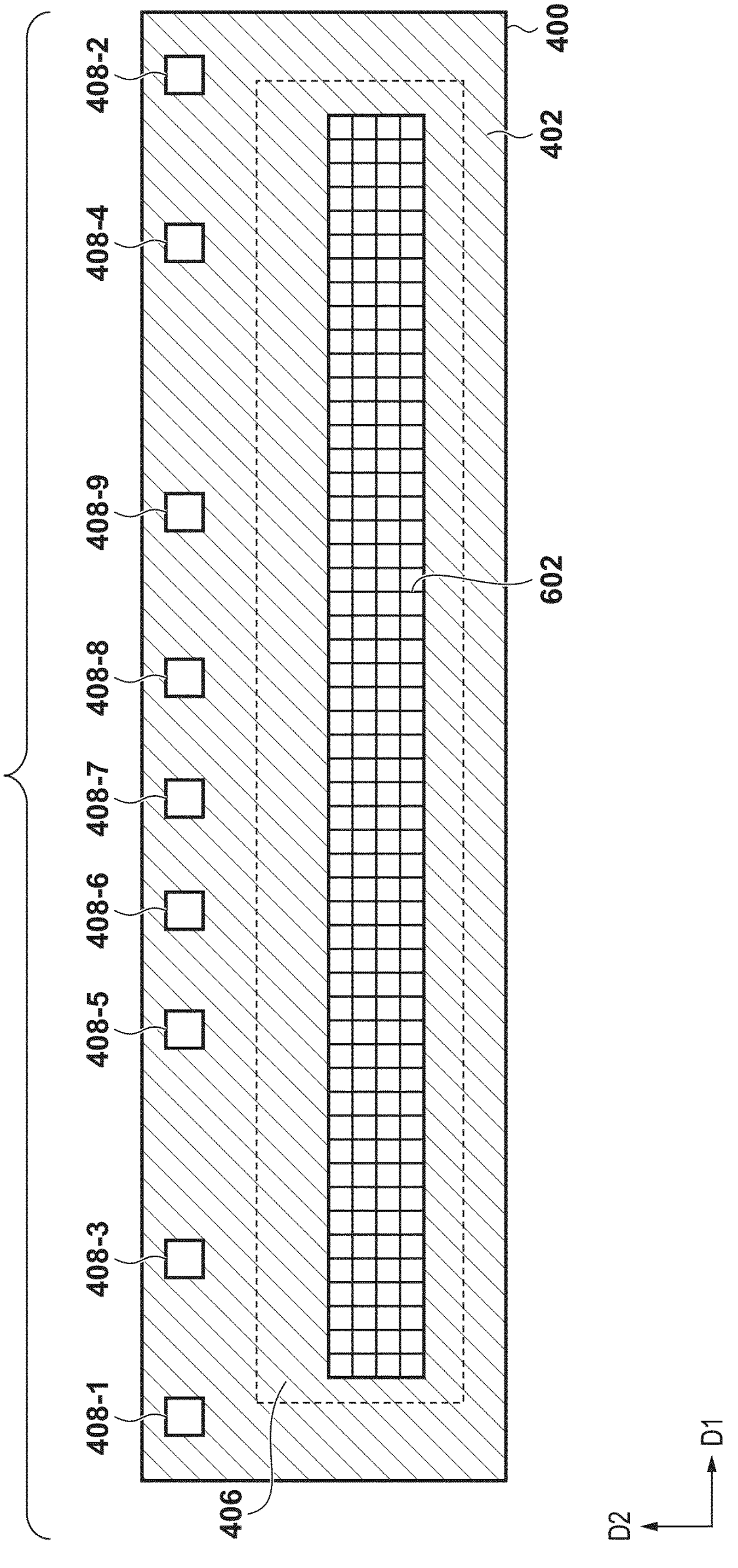
FIG. 4 is a plan view of a schematic configuration of a light-emitting chip according to one or more aspects of the present disclosure.

FIG. 4 is a plan view of a schematic configuration of one light-emitting chip 400. The plurality of light-emitting elements 602 of each light-emitting chip 400 are formed on a light-emitting substrate 402, which is a silicon substrate, for example. The light-emitting substrate 402 has a circuit section 406 for driving the plurality of light-emitting elements 602. Pads 408-1 to 408-9 are connected to signal lines for communicating with the image controller 710, power lines for connection with power supplies, and ground lines for connection with ground. The signal lines, the power lines, and the ground lines may be gold wires, for example.

The number J of light-emitting elements 602 arranged in each row of one light-emitting chip 400 (J=N/20) may be equal to 748 (J=748), for example. Meanwhile, the number M of light-emitting elements 602 arranged in each column of one light-emitting chip 400 may be equal to 4 (M=4), for example. That is to say, in an example embodiment, each light-emitting chip 400 has 2992 (=748×4) light-emitting elements 602 in total, with 748 elements in the axial direction D1 and 4 elements in the circumferential direction D2. The interval between central points of light-emitting elements 602 adjoining in the circumferential direction D2 may be about 21.16 μm corresponding to a resolution of 1200 dpi, for example. The interval between central points of light-emitting elements 602 adjoining in the axial direction D1 may also be about 21.16 μm and, in this case, 748 light-emitting elements 602 occupy the length of about 15.8 mm in the axial direction D1. It should be noted that, for convenience of description, FIG. 4 shows an example where the light-emitting elements 602 are arranged completely in a grid-like pattern in each light-emitting chip 400, however, the M (M=4) light-emitting elements 602 of each column may be arranged in a staircase pattern or in a partially-staircase pattern. The arrangement of light-emitting elements 602 in a staircase pattern will be further described below.

Figure 5:
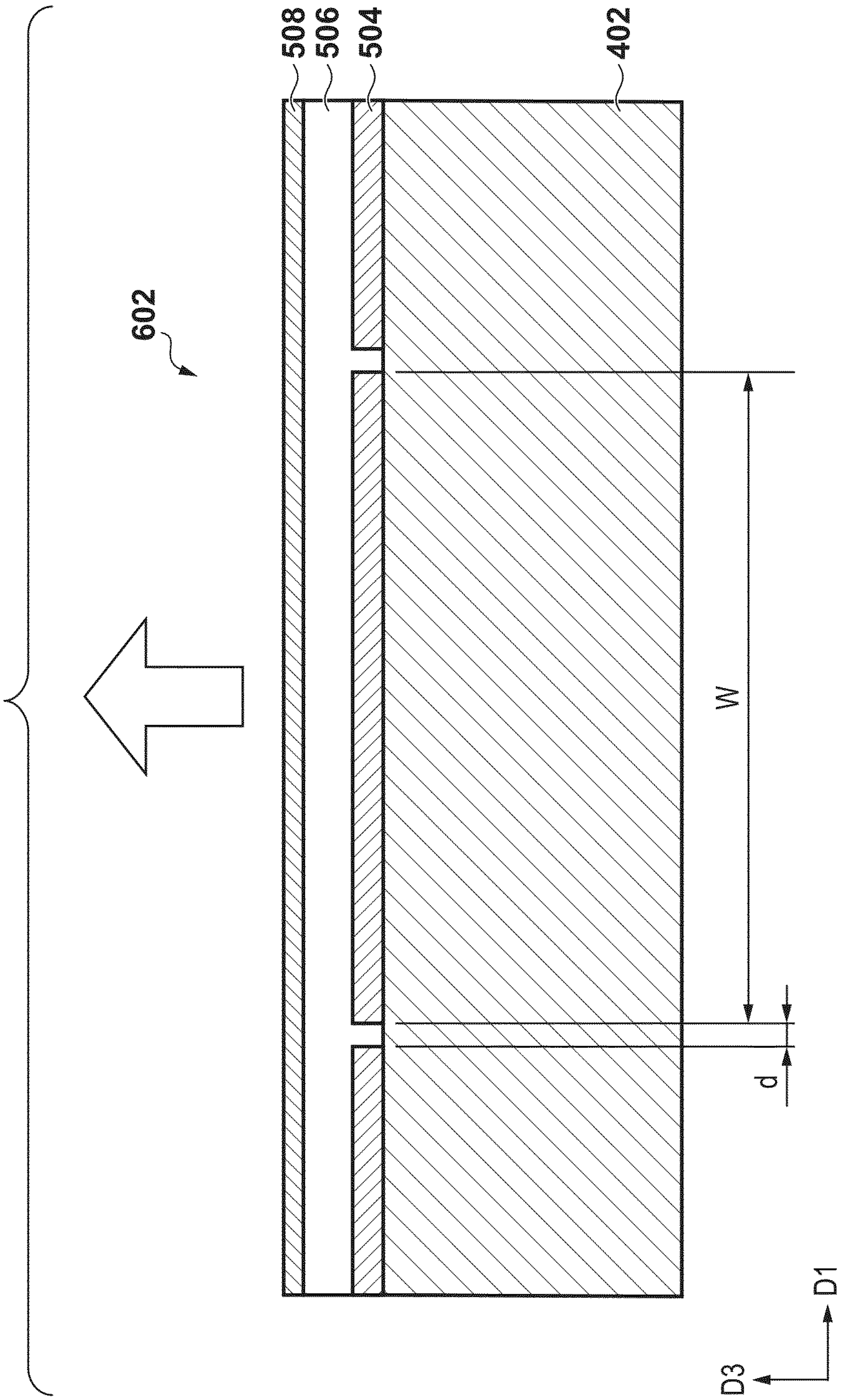
FIG. 5 is a cross-sectional view showing an example of a configuration of a light-emitting element according to an embodiment.

FIG. 5 is a cross-sectional view showing an example of a configuration of the light-emitting element 602. A plurality of lower electrodes 504 are formed on the light-emitting substrate 402 which is a silicon substrate. A gap with length d is provided between two adjoining lower electrodes 504. A light-emitting layer 506 is provided on the lower electrodes 504, and an upper electrode 508 is provided on the light-emitting layer 506. The upper electrode 508 is one common electrode for the plurality of lower electrodes 504. When a voltage is applied between the lower electrodes 504 and the upper electrode 508, the light-emitting layer 506 emits light as a result of electric current flowing from the lower electrodes 504 to the upper electrode 508. Thus, one lower electrode 504 and partial regions of the light-emitting layer 506 and the upper electrode 508 that correspond to the lower electrode 504 constitute one light-emitting element 602. That is, in the present embodiment, the light-emitting substrate 402 includes a plurality of light-emitting elements 602.

An organic EL film is used as the light-emitting layer 506. That is, the light-emitting element 602 is an organic EL element. The upper electrode 508 is constituted by a transparent electrode made of indium tin oxide (ITO) or the like, for example, so as to allow the light-emission wavelength of the light-emitting layer 506 to pass through. Note that, in the present embodiment, the entire upper electrode 508 allows the light-emission wavelength of the light-emitting layer 506 to pass through, but the entire upper electrode 508 does not necessarily allow the light-emission wavelength to pass through. Specifically, it is sufficient that a partial region through which light from each light-emitting element 602 passes allows the light-emission wavelength to pass through.

Note that, in FIG. 5, one continuous light-emitting layer 506 is formed, but a plurality of light-emitting layers 506 each having a width equal to the width W of a corresponding lower electrode 504 may alternatively be formed on the respective lower electrodes 504. Further, in FIG. 5, the upper electrode 508 is formed as one common electrode for the plurality of lower electrodes 504; but, a plurality of upper electrodes 508 each having a width equal to the width W of a corresponding lower electrode 504 may alternatively be formed in correspondence with the respective lower electrodes 504. Further, a first plurality of lower electrodes 504, out of the lower electrodes 504 of each light-emitting chip 400, may be covered by a first light-emitting layer 506, and a second plurality of lower electrodes 504 may be covered by a second light-emitting layer 506. Similarly, a first upper electrode 508 may be formed in common for a first plurality of lower electrodes 504, out of the lower electrodes 504 of each light-emitting chip 400, and a second upper electrode 508 may be formed in common for a second plurality of lower electrodes 504. With such a configuration as well, one lower electrode 504 and regions of the light-emitting layer 506 and the upper electrode 508 that correspond to the lower electrode 504 constitute one light-emitting element 602.

Figure 6:
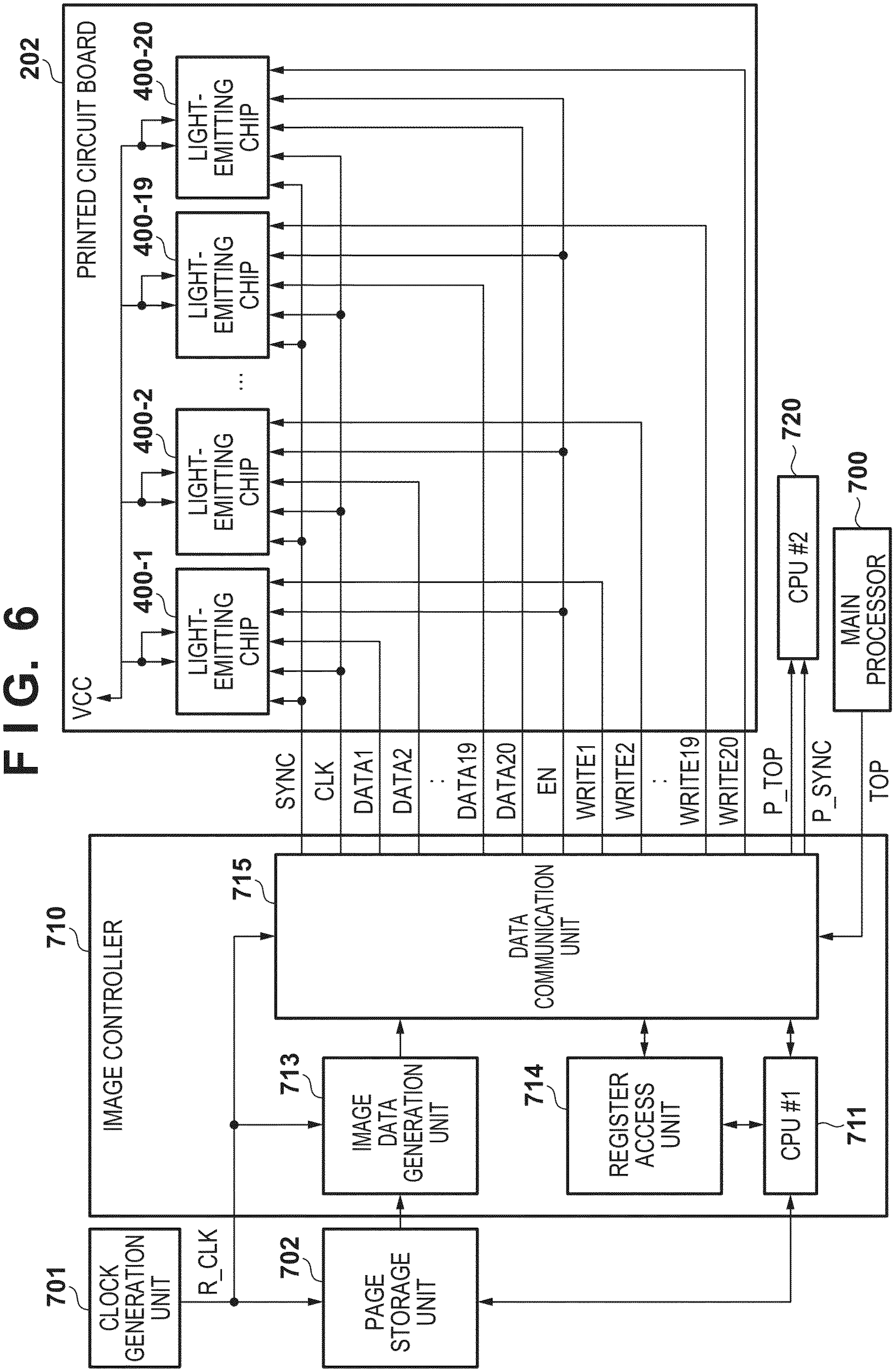
FIG. 6 is a block diagram showing an example of a control configuration of an exposure apparatus according to one or more aspects of the present disclosure.

FIG. 6 is block diagram showing an example of a control configuration for controlling the light-emitting chips 400. The image controller 710 is a control circuit that communicates with the printed circuit board 202 via a plurality of signal lines (wires). The image controller 710 includes a first CPU 711, an image data generation unit 713, a register access unit 714, and a data communication unit 715. The data communication unit 715 terminates signal lines connected to the printed circuit board 202. An n-th light-emitting chip 400-*n* (n is an integer from 1 to 20) on the printed circuit board 202 is connected to the data communication unit 715 via a pair of a data signal line and a control signal line. The data signal line carries image data DATAn for the light-emitting chip 400-*n*. The control signal line carries control data WRITEn to be written to a register of the light-emitting chip 400-*n*.

Further, a clock signal line, a synchronization signal line, and an enable signal line are provided between the data communication unit 715 and each light-emitting chip 400-*n*. The clock signal line carries a clock signal CLK for identifying the timing of each bit of the image data DATAn and the control data WRITEn. The data communication unit 715 generates the clock signal CLK based on a reference clock signal R_CLK generated by the clock generation unit 701, and outputs the generated clock signal CLK to the clock signal line. The synchronization signal line carries a below-described first synchronization signal SYNC. The enable signal line carries a below-described enable signal EN.

A page storage unit 702 is a storage device that temporarily stores, on a page-by-page basis, page description language (PDL) data representing each page of an input image of a print job received from the reading unit 100 or an external device. The page storage unit 702 may be, for example, a large-capacity memory or hard disk drive (HDD).

The first CPU 711 is a control unit that controls image processing in the image controller 710 and communication with the printed circuit board 202. The second CPU 720 is a control unit that controls image-forming operations in the image-forming unit 101. The image data generation unit 713 performs image processing on PDL data on each page stored in the page storage unit 702 to generate image data in a binary bitmap format to be used for light emission control of the plurality of light-emitting elements 602 of the light-emitting chips 400 on the printed circuit board 202. Image processing here may include, for example, raster conversion, gradation correction, color conversion, and halftoning. The image data generation unit 713 outputs the generated image data as input image data to the data communication unit 715. The register access unit 714 obtains control data to be written to the register in each light-emitting chip 400 from the first CPU 711 and outputs the obtained control data to the data communication unit 715.

The image-forming apparatus 1 also includes a main processor (e.g., CPU) 700 that controls overall operations of the image-forming apparatus 1. When starting execution of a print job, the main processor 700 outputs a first trigger signal TOP indicating an operation start timing to the image-making unit 103, the fixing unit 104, and the transport unit 105. The fixing unit 104 starts controlling the temperature of a fixing roller in response to the input of the first trigger signal TOP. The transport unit 105 starts feeding and transporting a sheet in response to the input of the first trigger signal TOP.

The data communication unit 715 starts operating in response to the input of the first trigger signal TOP, and outputs to the second CPU 720 a second trigger signal P_TOP indicating a timing of starting transmission of input image data for each page, and a second synchronization signal P_SYNC indicating a synchronization timing for each line. The second CPU 720 causes respective parts of the image-forming unit 101 to start operating in response to the input of the second trigger signal P_TOP. For example, the second CPU 720 synchronously controls the rotation of the photosensitive member 102 and the transport of the sheet using the transfer belt 111 based on the second synchronization signal P_SYNC, so that a toner image on the surface of the photosensitive member 102 is transferred to a designated image-forming position on the sheet.

Figure 7:
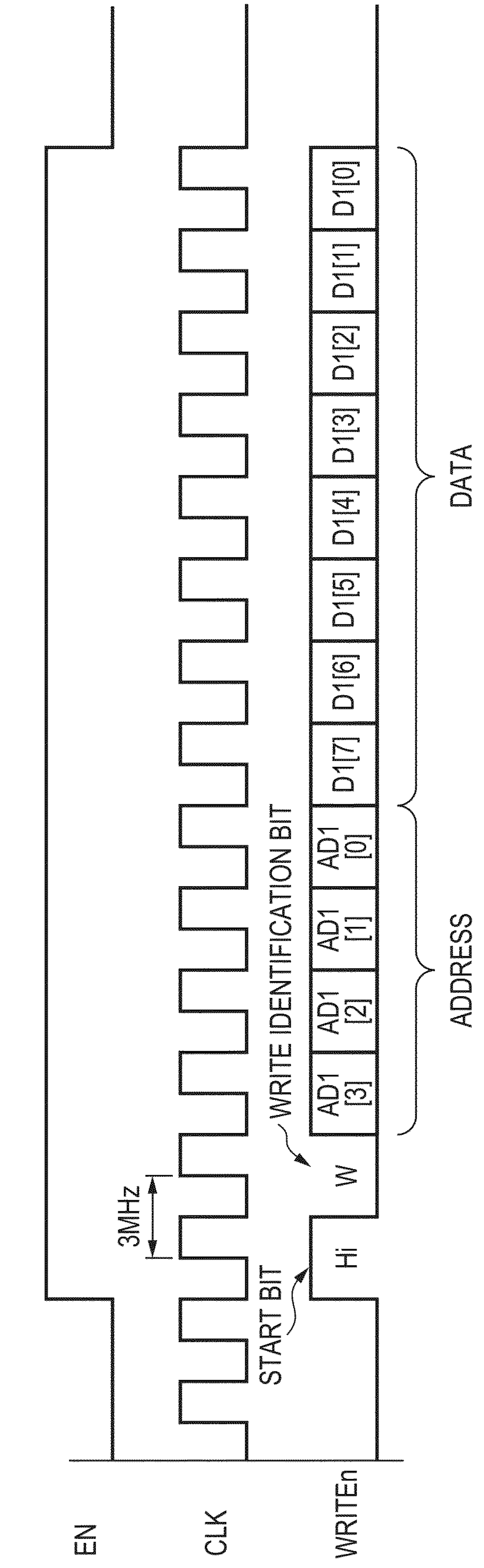
FIG. 7 is a signal chart related to writing of control data to the light-emitting chip according to one or more aspects of the present.

FIG. 7 is a signal chart related to writing of control data to the register of the light-emitting chip 400. The enable signal EN is at a high level on the enable signal line while control data is transmitted. The data communication unit 715 transmits a start bit to the control signal line synchronously with the rise of the enable signal. Next, the data communication unit 715 transmits a write identification bit indicating a writing operation, and thereafter transmits an address (four bits in this example) of the register to which control data is to be written, and the control data (eight bits in this example). The data communication unit 715 sets the frequency of the clock signal CLK to, for example, 3 MHz when writing to the register.

Figure 8:
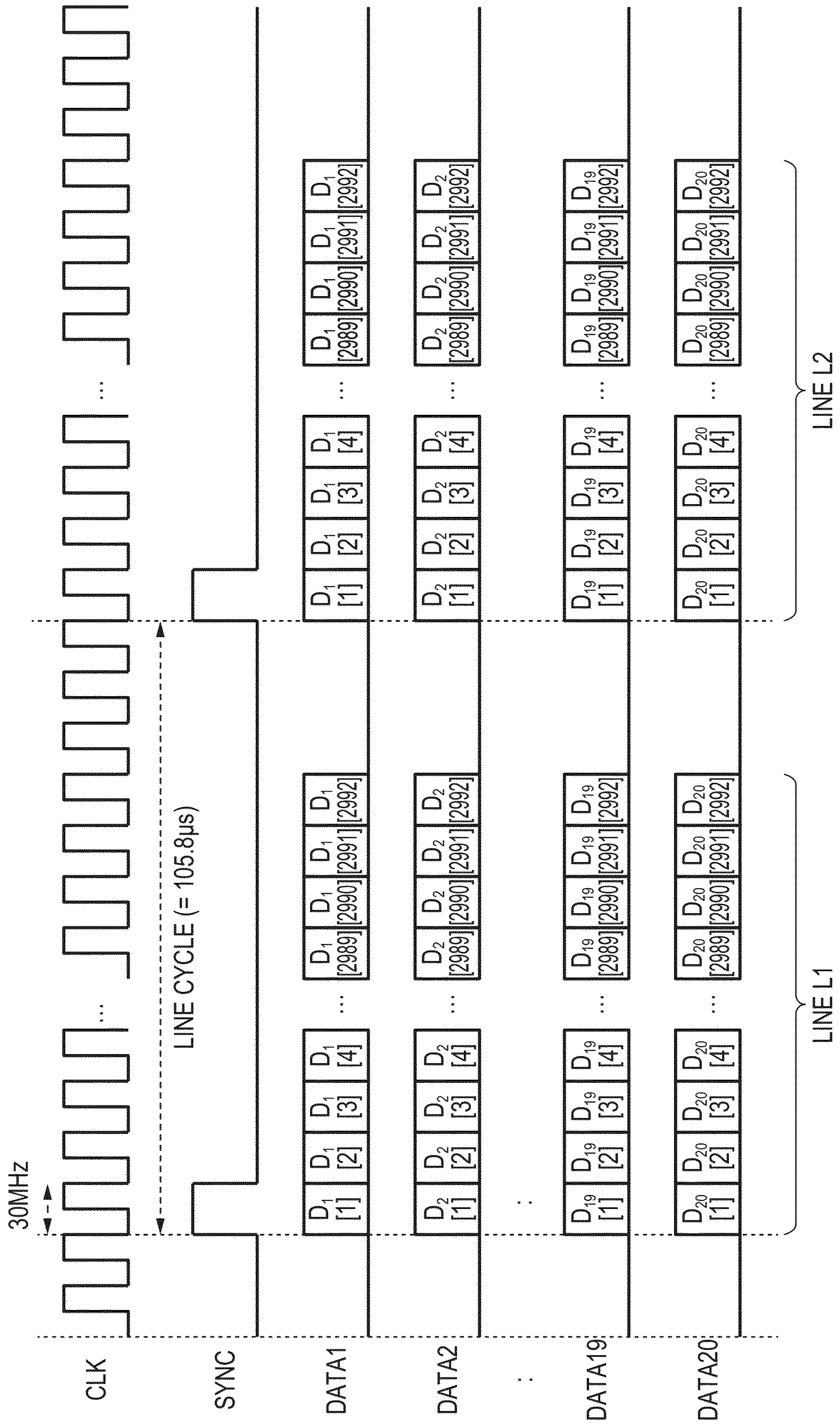
FIG. 8 is a signal chart related to transmission of image data to the light-emitting chip according to one or more aspects of the present disclosure.

FIG. 8 is a signal chart related to transmission of image data to each light-emitting chip 400. The data communication unit 715 transmits a periodic first synchronization signal SYNC indicating the timing of exposing the photosensitive member 102 for each line of image data, to the synchronization signal line. When the circumferential speed of the photosensitive member 102 is 200 mm/s and the resolution in the circumferential direction is 1200 dpi (approximately 21.16 μm), the first synchronization signal SYNC is a pulse signal that switches to a high level in a cycle of approximately 105.8 μs. The data communication unit 715 transmits image data DATA1 to DATA20 in parallel to twenty data signal lines synchronously with the rise of the first synchronization signal SYNC. Since each light-emitting chip 400 of the present embodiment has 2992 light-emitting elements 602, bits indicating whether or not to cause the 2992 light-emitting elements 602 to emit light need to be transmitted to the light-emitting chip 400 within a cycle of approximately 105.8 μs. Therefore, in this example, the data communication unit 715 sets the frequency of the clock signal CLK to 30 MHz when transmitting the image data, as shown in FIG. 8. Note that, as used herein, image data on an i-th line that is transmitted to a light-emitting chip 400-*n* is represented as Li-$D_n$, and when referring to each bit in the image data, an index of the bit (i.e., a light-emitting element number) is also represented in square brackets. However, in FIG. 8, the line number Li is omitted in the frame of each bit.

Figure 9:
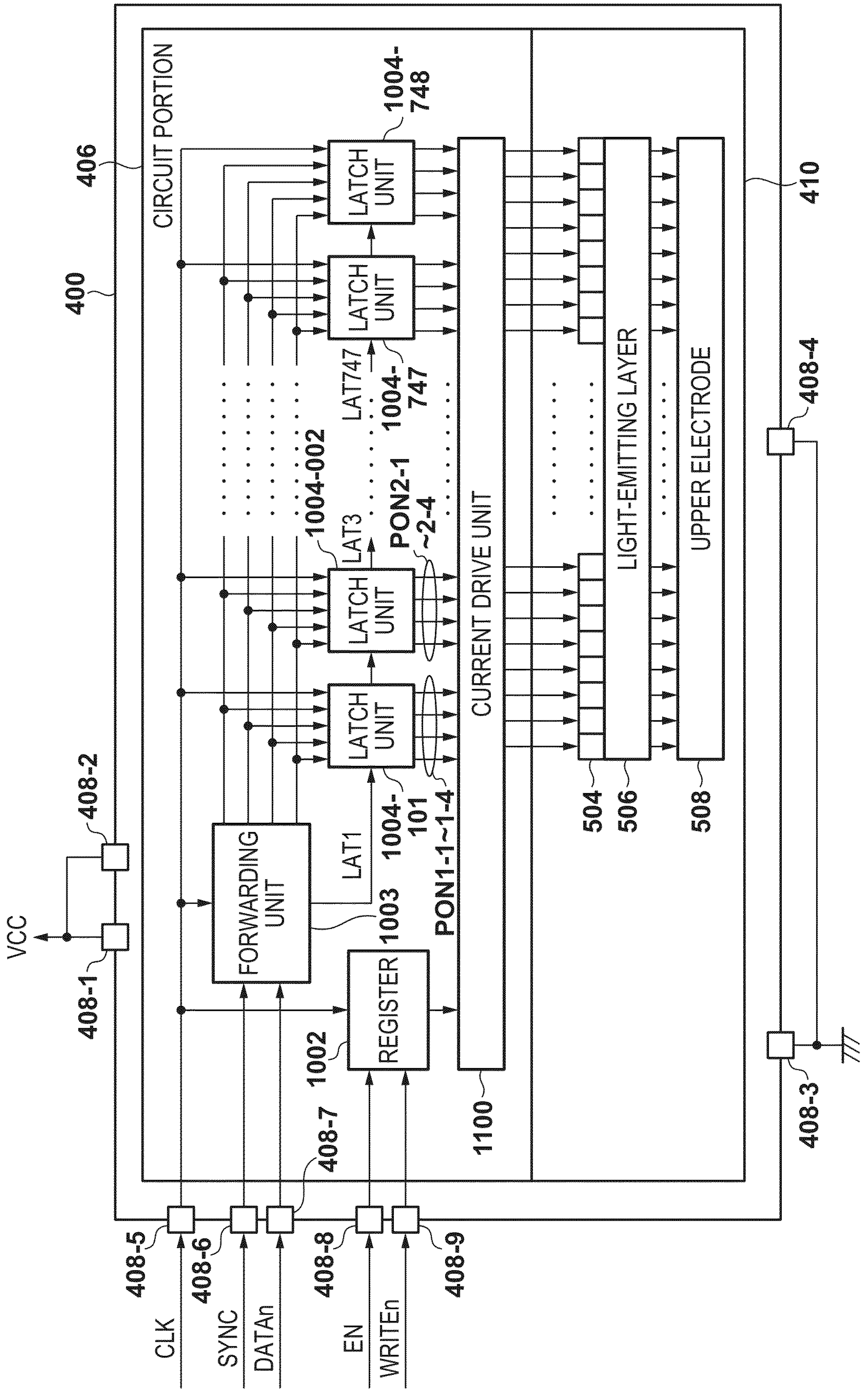
FIG. 9 is a block diagram showing an example of a detailed circuit configuration of the light-emitting chip according to one or more aspects of the present disclosure.

FIG. 9 is a block diagram showing an example of a detailed circuit configuration of one light-emitting chip 400 (n-th light-emitting chip 400-*n*). The light-emitting chip 400 has nine pads 408-1 to 408-9, a circuit portion 406, and a light-emitting element array 410. The pads 408-1 and 408-2 are connected to a power supply voltage VCC through power supply lines. Electric power from the power supply voltage VCC is supplied to each circuit in the circuit portion 406 of the light-emitting chip 400. The pads 408-3 and 408-4 are connected to ground through ground lines. Each circuit in the circuit portion 406 and the upper electrode 508 are connected to ground via the pads 408-3 and 408-4. The clock signal line is connected to a register 1002, a forwarding unit 1003, and latch units 1004-001 to 1004-748 via the pad 408-5. The synchronization signal line and the data signal line are connected to the forwarding unit 1003 via the pads 408-6 and 408-7, respectively. The enable signal line and the control signal line are connected to the register 1002 via the pads 408-8 and 408-9, respectively. Control data indicating the magnitude of drive current to be supplied to each light-emitting element 602, for example, is written to the register 1002.

Starting from the rise of the first synchronization signal SYNC, the forwarding unit 1003 receives input image data DATAn that includes a series of pixel values indicating whether or not to cause each one of the light-emitting elements 602 to emit light, synchronously with the clock signal CLK. The forwarding unit 1003 performs serial-to-parallel conversion in units of Y (e.g., Y=4) pixel values for the series of pixel values serially received. For example, the forwarding unit 1003 has four cascaded D flip-flops, and parallelizes the pixel values DATA-1, DATA-2, DATA-3, and DATA-4 that are input over four clocks, and outputs them to the latch units 1004-001 to 1004-748. The forwarding unit 1003 also has four D flip-flops for delaying the first synchronization signal SYNC, and outputs a first latch signal LAT1 to the latch unit 1004-001 at a timing delayed for four clocks after the first synchronization signal SYNC is input.

A k-th latch unit 1004-*k* (k is an integer from 1 to 748) holds, using a latch circuit, the four pixel values DATA-1, DATA-2, DATA-3, and DATA-4 that are input from the forwarding unit 1003 simultaneously with the input of a k-th latch signal. The k-th latch unit 1004-*k*, except for the last latch unit 1004-748, delays the k-th latch signal LATk for four clocks and outputs a (k+1)-th latch signal LAT(k+1) to a latch unit 1004-(*k*+1). The k-th latch unit 1004-*k* continues to output a drive signal based on the four pixel values held by the latch circuit to the current drive unit 1100 during the signal cycle of the k-th latch signal. For example, there is a delay for four clocks between the timing when the first latch signal is input to the latch unit 1004-1 and the timing when the second latch signal is input to the latch unit 1004-2. Therefore, the latch unit 1004-1 outputs a drive signal based on the first, second, third, and fourth pixel values to the current drive unit 1100, while the latch unit 1004-2 outputs a drive signal based on the fifth, sixth, seventh, and eighth pixel values to the current drive unit 1100. In general, the latch unit 1004-*k* outputs a drive signal based on the (4k−3)-th, (4k−2)-th, (4k−1)-th, and (4k)-th pixel values to the current drive unit 1100. Therefore, in the embodiment shown in FIG. 9, the 748 latch units 1004-001 to 1004-748 transmit, substantially in parallel, 2992 drive signals for controlling drive of 2992 (=748×4) light-emitting elements 602 to the current drive unit 1100. Each drive signal is a binary signal that indicates one of high and low levels.

The current drive unit 1100 has 2992 light emission drive circuits corresponding to the 2992 light-emitting elements 602 in the light-emitting element array 410. Each light emission drive circuit causes a drive current having a magnitude indicated by control data in the register 1002 to flow through the light-emitting layer 506 of the corresponding light-emitting element 602 while the corresponding drive signal is at a high level, which means that light emission is on. This causes the light-emitting element 602 to emit light at a target light amount. Note that the control data may indicate one individual current value for each light-emitting element 602, one current value for each group of light-emitting elements 602, or one current value common to all the light-emitting elements 602.

Figure 10:
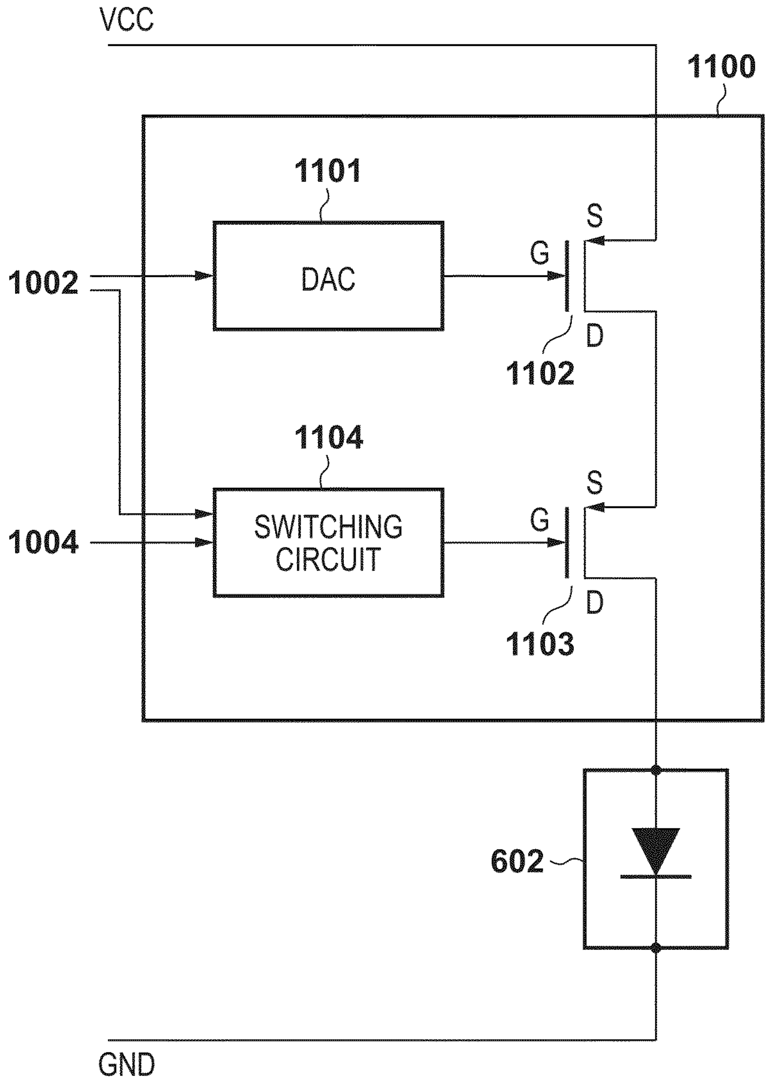
FIG. 10 is a circuit diagram showing a partial configuration of a current drive unit corresponding to one light-emitting element.

FIG. 10 shows an example of a partial configuration of the current drive unit 1100 corresponding to one light-emitting element 602. Referring to FIG. 10, the current drive unit 1100 includes a digital-to-analog converter (DAC) 1101, a first transistor 1102, a second transistor 1103, and a switching circuit 1104. The DAC 1101 performs digital-to-analog conversion on a digital value (current setting value) of light emission intensity stored in the register 1002, and outputs a corresponding analog signal to a gate of the first transistor 1102. The first transistor 1102 is a current amplifier circuit and may be, for example, a P-channel MOSFET. A source of the first transistor 1102 is connected to the power supply voltage VCC. A drain of the first transistor 1102 is connected to a source of the second transistor 1103. The first transistor 1102 draws from the source a current whose magnitude depends on the amount of current of the analog signal input to the gate, and outputs the drawn current to the drain. The second transistor 1103 is a switching circuit and may be, for example, a P-channel MOSFET. During execution of a normal print job, a drive signal (indicating whether light emission is on or off) from the latch unit 1004 is input to a gate of the second transistor 1103 via the switching circuit 1104. A drain of the second transistor 1103 is connected to the lower electrode 504 of the light-emitting element 602. The second transistor 1103 outputs the current input to the source to the light-emitting element 602 via the drain when the drive signal input to the gate indicates that light emission is on (e.g., high level). Thus, during a cycle when the drive signal indicates that light emission is on, a current having a magnitude corresponding to a parameter value stored in the register 1002 is supplied to the light-emitting element 602, thereby causing each light-emitting element 602 to emit light at a light emission intensity designated by the control data.

The switching circuit 1104 is a circuit for switching between a normal mode and a test mode. The switching circuit 1104 applies a drive signal to the gate of the second transistor 1103 in the normal mode, while in the test mode, the switching circuit 1104 applies a test mode signal, which is constantly at a high level, to the gate of the second transistor 1103. Thus, in the test mode, the gate of the second transistor 1103 is forced to remain on. The mode of the switching circuit 1104 may be, for example, set by the control data written to the register 1002. The test mode may be used, for example, in order to inspect the light emission state of the light-emitting elements when the apparatus is produced.

Although FIG. 10 shows only a portion corresponding to one light-emitting element 602, the current drive unit 1100 may have, in actuality, the same number of similar circuits as the number of (e.g., 748×4-2992) light-emitting elements 602. However, the DAC 1101 may be used in common by a plurality of light-emitting elements 602.

Figure 11:
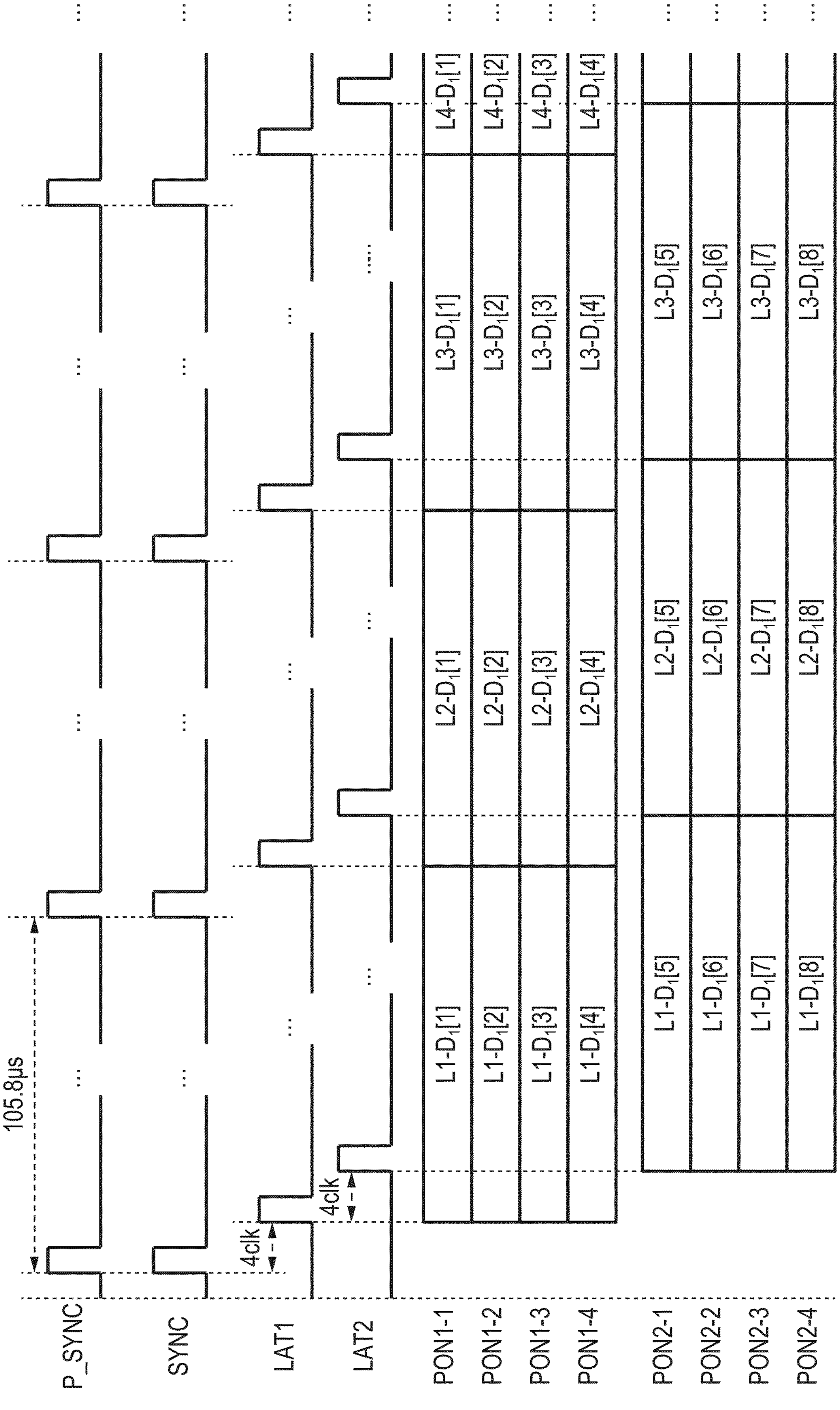
FIG. 11 is a signal chart related to the timing of outputting a drive signal from each latch unit to the current drive unit.

FIG. 11 is a signal chart related to the timing of outputting the drive signal from each latch unit 1004 to the current drive unit 1100.

The uppermost row in FIG. 11 indicates the second synchronization signal P_SYNC output from the data communication unit 715 to the second CPU 720. The cycle of the second synchronization signal P_SYNC may be approximately 105.8 μs, as described above. The second row indicates the first synchronization signal SYNC output from the data communication unit 715 to each light-emitting chip 400. The first synchronization signal SYNC is synchronized with the second synchronization signal P_SYNC, and here, the cycle of the first synchronization signal SYNC is the same as the cycle of the second synchronization signal P_SYNC.

The third row indicates the first latch signal LAT1 input to the first latch unit 1004-001. The cycle of the first latch signal LAT1 is the same as the cycle of the first synchronization signal SYNC, but the timing of the rise of the first latch signal LAT1 is four clocks later than the first synchronization signal SYNC. The fourth row indicates the second latch signal LAT2 input to the second latch unit 1004-002. The cycle of the second latch signal LAT2 is the same as the cycle of the first synchronization signal SYNC, but the timing of the rise of the second latch signal LAT2 is four clocks later than the first latch signal LAT1. In general, the timing of the rise of the k-th latch signal LATk is four clocks later than the (k−1)-th latch signal LAT(k−1).

The forwarding unit 1003 of the light-emitting chip 400-1 receives image data L1-$D_1$[1] to L1-$D_1$ in sequence during the first line cycle. Starting from the rise of the first latch signal LAT1, the latch unit 1004-001 outputs in parallel four drive signals based on the image data L1-$D_1$[1] to L1-$D_1$[4] to signal lines PON1-1 to PON1-4. The output of these drive signals is maintained until the next rise of the first latch signal LAT1 (i.e., over the time length of one line cycle). For example, if the image data L1-$D_1$[1] indicates that light emission is on, the first light-emitting element 602 of the light-emitting chip 400-1 is maintained in a light-emitting state through the first line cycle. Also, for example, if the image data L1-$D_1$[1] indicates that light emission is off, the first light-emitting element 602 of the light-emitting chip 400-1 is maintained in a non-light-emitting state through the first line cycle. Starting from the rise of the second latch signal LAT2, the latch unit 1004-002 outputs in parallel four drive signals based on the image data L1-$D_1$[5] to L1-$D_1$[8] to signal lines PON2-1 to PON2-4. The output of these drive signals is maintained until the next rise of the second latch signal LAT2. Drive signals from the latch units 1004-003 to 1004-748 are output in the same manner.

Next, the forwarding unit 1003 receives image data L2-$D_1$ [1] to L2-$D_1$ in sequence during the second line cycle. Starting from the second rise of the first latch signal LAT1, the latch unit 1004-001 outputs in parallel four drive signals based on the image data L2-$D_1$[1] to L2-$D_1$[4] to the signal lines PON1-1 to PON1-4. The output of these drive signals is maintained until the next rise of the first latch signal LAT1. Starting from the second rise of the second latch signal LAT2, the latch unit 1004-002 outputs in parallel four drive signals based on the image data L2-$D_1$[5] to L2-$D_1$[8] to the signal lines PON2-1 to PON2-4. The output of these drive signals is maintained until the next rise of the second latch signal LAT2. Drive signals from the latch units 1004-003 to 1004-748 are output in the same manner.

Thus, through each line cycle indicated by the first synchronization signal SYNC, the light-emitting chip 400-*n* maintains, in a light-emitting state, light-emitting elements 602 that are indicated to emit light by the data signal (image data Li-Dn) input during the line cycle.

3. Variable Process Speed

<3-1. Related Issues>

However, there arises an issue with the above-described configuration of the exposure head 106 when the image-forming apparatus uses variable process speed depending on print job settings. For example, there are various types of sheets used for printing, and the basis weight may differ depending on the sheet type. As an example, the basis weight of plain paper may range from 60 to 105 [g/m$^2$], and the basis weight of thick paper may range from 150 to 300 [g/m$^2$] (however, these basis weight ranges do not limit the present embodiment). The amount of heat required to fix a toner image to a sheet increases as the basis weight of the sheet increases. This is because the basis weight positively correlates with heat capacity, and the higher the heat capacity, the lower the temperature rise per unit amount of heat received from the fixing roller. Therefore, in order to ensure the time for the fixing unit 104 to apply sufficient heat to a sheet, it is conceivable to make the process speed slower when printing on a sheet having a larger basis weight than when printing on a sheet having a smaller basis weight.

Specifically, in the present embodiment, the main processor 700 functions as a setting unit that sets the rotation speed (i.e., process speed) of the photosensitive member 102 depending on the sheet type set for the print job. For example, the main processor 700 sets the rotation speed of the photosensitive member 102 to a first rotation speed $P_1$ when plain paper is used, and sets the rotation speed of the photosensitive member 102 to a second rotation speed $P_2$ when thick paper is used, where $P_2$ is 1/N of $P_1$ and N is greater than 1. By thus setting the process speed slower when a sheet having a large basis weight is used, a sufficient amount of heat can be applied to a toner image to fuse toner, and the toner can be reliably fixed to the sheet.

Then, in general, the process speed is inversely proportional to the line cycle, so that the slower the process speed is set, the longer the line cycle is. Further, if the light-emitting elements 602 are maintained in a light-emitting state through one line cycle as in the above-described configuration of the exposure head 106, there is a concern that a long-term line cycle will result in excessive exposure of the photosensitive member.

Figure 12:
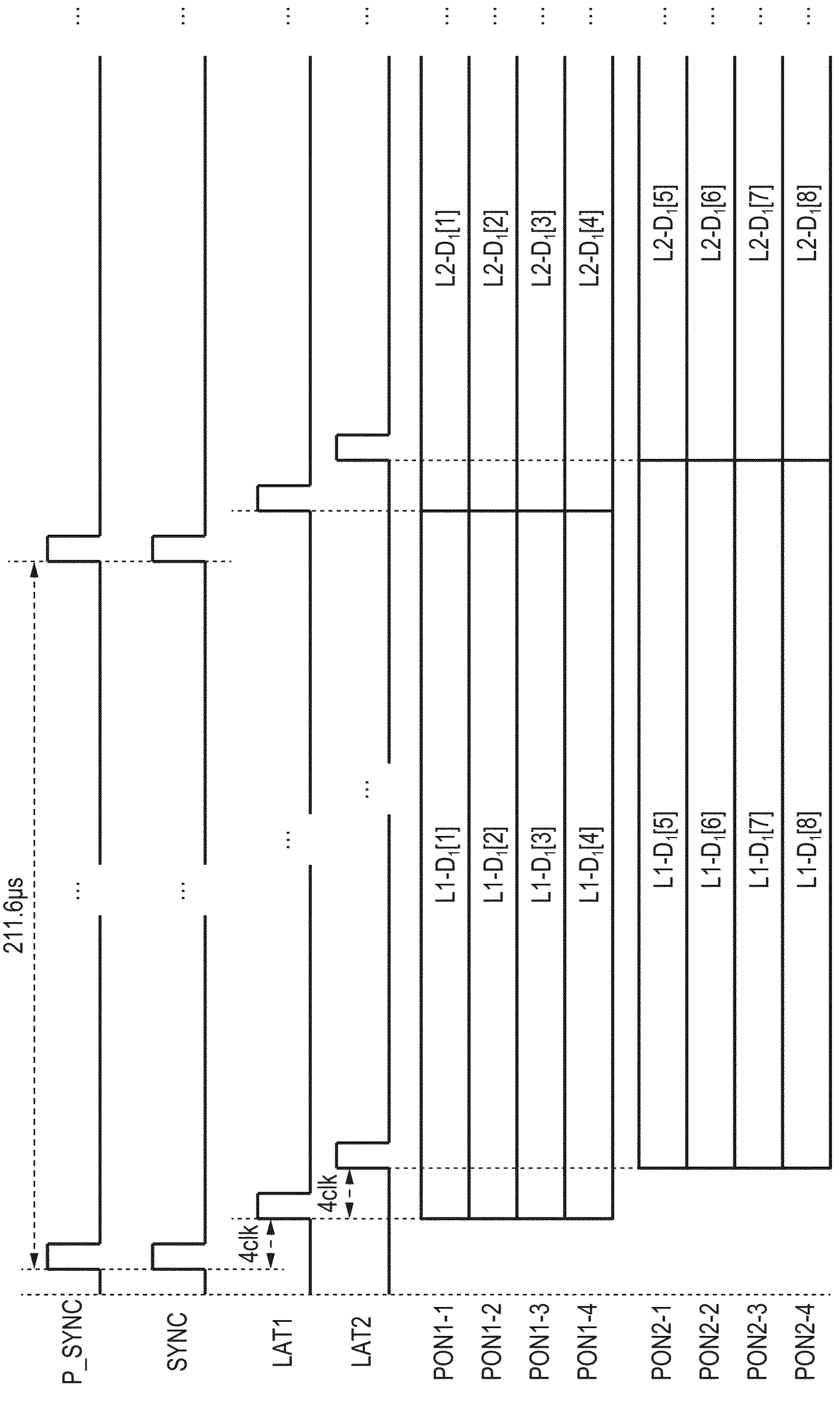
FIG. 12 is a signal chart for illustrating an issue related to one or more aspects of the present disclosure.

This excessive exposure will be explained by taking the case where the ratio N of the process speed is equal to 2 as an example, with reference to FIG. 12. FIG. 12 is a signal chart similar to that shown in FIG. 11, except that the process speed in FIG. 12 is set to ½ of the process speed of the example in FIG. 11.

Since the process speed is set to ½, the cycle of the second synchronization signal P_SYNC shown in the uppermost row in FIG. 12 is approximately 211.6 (=105.8×2) μs. The first synchronization signal SYNC shown in the second row has the same line cycle as that of the second synchronization signal P_SYNC.

The cycle of the first latch signal LAT1 shown in the third row is the same as the cycle of the first synchronization signal SYNC, but the timing of the rise of the first latch signal LAT1 is four clocks later than the first synchronization signal SYNC. The cycle of the second latch signal LAT2 shown in the fourth row is the same as the cycle of the first synchronization signal SYNC, but the timing of the rise of the second latch signal LAT2 is four clocks later than the first latch signal LAT1.

The forwarding unit 1003 of the light-emitting chip 400-1 receives image data L1-$D_1$[1] to L1-$D_1$ in sequence during the first line cycle. Starting from the rise of the first latch signal LAT1, the latch unit 1004-001 outputs in parallel four drive signals based on the image data L1-$D_1$[1] to L1-$D_1$[4] to the signal lines PON1-1 to PON1-4. The output of these drive signals is maintained until the next rise of the first latch signal LAT1. For example, if the image data L1-$D_1$[1] indicates that light emission is on, the first light-emitting element 602 of the light-emitting chip 400-1 is maintained in a light-emitting state through the first line cycle that spans approximately 211.6 μs. The same applies to the other light-emitting elements 602 of the light-emitting chip 400-1 and the light-emitting elements 602 of the other light-emitting chips 400.

That is, when the line cycle indicated by the first synchronization signal SYNC is doubled, the time length that a light-emitting element 602 corresponding to one pixel value is maintained in a light-emitting state based on this pixel value is doubled, which means that the amount of exposure of a corresponding dot on the surface of the photosensitive member 102 is doubled. An increase in the amount of exposure of the photosensitive member 102 results in a corresponding increase in the amount of charge accumulated in an electrostatic latent image, causing a developed toner image to be excessively dense. In addition, it is also possible that an excessive increase in the amount of charge of an electrostatic latent image has the adverse effect of accelerating the deterioration of the photosensitive member 102.

Excessive exposure of the photosensitive member 102 can be prevented by causing the light-emitting elements 602 to emit light only in a portion of a line cycle that lengthens in response to a change in the process speed setting. However, such synchronization control complicates the circuits in the light-emitting chips 400, which leads to increased manufacturing and development costs for the image-forming apparatus 1 and the exposure head 106.

<3-2. Prevention of Excessive Exposure>

In the present embodiment, the second synchronization signal for drive control of the image-forming unit 101 is set so as to indicate a line cycle that realizes a desired process speed. Meanwhile, in order to prevent the aforementioned excessive exposure while avoiding the complication of the circuit configuration, the first synchronization signal for light emission control of each light-emitting chip is set so as to indicate a fixed line cycle without depending on the process speed. The process speed may be rephrased as the rotation speed of the photosensitive member. More specifically, the two synchronization signals may indicate the line cycles as follows:

Second Synchronization Signal P_SYNC

- indicates a first line cycle when the photosensitive member 102 rotates at a first rotation speed, and
- indicates a second line cycle that is N times the first line cycle (N is an integer of 2 or more) when the photosensitive member 102 rotates at a second rotation speed that is 1/N of the first rotation speed.

First Synchronization Signal SYNC

- indicates the aforementioned first line cycle regardless of the rotation speed of the photosensitive member 102.

In addition, when the photosensitive member 102 rotates at the aforementioned second rotation speed, the data communication unit 715

- transmits data signals of one line to the light-emitting chips 400-1 to 400-20 during one line cycle out of N line cycles indicated by the first synchronization signal SYNC, and
- transmits a non-light-emission signal for causing none of the light-emitting elements 602 to emit light to the light-emitting chips 400-1 to 400-20 during the remaining line cycles out of the N line cycles.

The above-described configuration makes it possible to avoid the complication of the circuit configuration of the light-emitting chips due to the variable setting of the process speed and to promote miniaturization of the device. Furthermore, excessive exposure of the photosensitive member is also prevented, so that a high-quality printed image can be provided, and deterioration of the photosensitive member is suppressed. An example of a detailed configuration of the data communication unit 715 for realizing such an embodiment will be specifically described in the next section.

4. Example Configuration of Data Communication Unit

Figure 13:
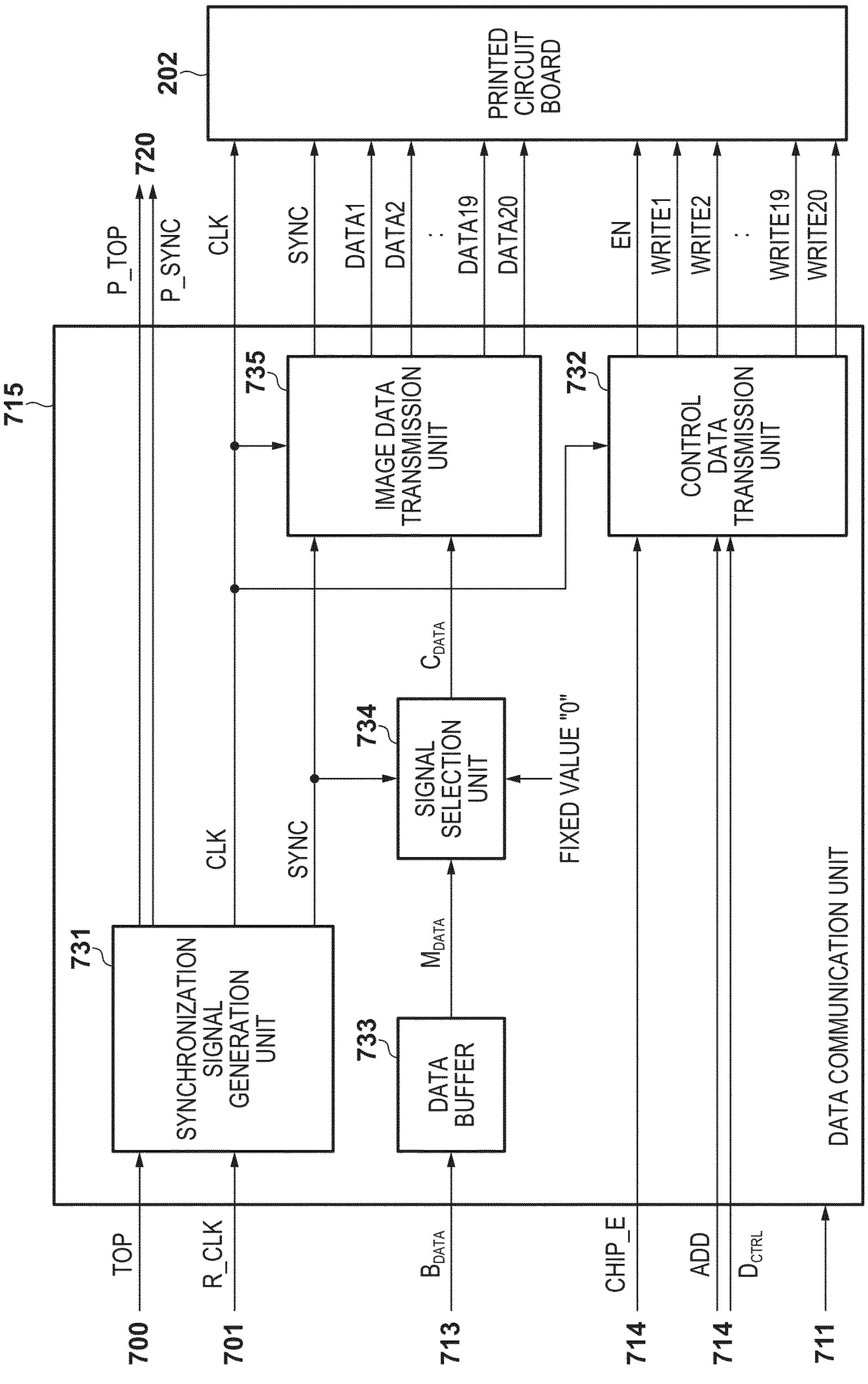
FIG. 13 is a block diagram showing an example of a detailed configuration of a data communication unit according to one or more aspects of the present disclosure.

FIG. 13 is a block diagram showing an example of a detailed configuration of the data communication unit 715. Referring to FIG. 13, the data communication unit 715 includes a synchronization signal generation unit 731, a control data transmission unit 732, a data buffer 733, a signal selection unit 734, and an image data transmission unit 735.

<4-1. Details of Each Unit>

The synchronization signal generation unit 731 generates a clock signal CLK based on a reference clock signal R_CLK input from the clock generation unit 701. The synchronization signal generation unit 731 may variably set the frequency of the clock signal CLK under the control of the first CPU 711. For example, the frequency of the clock signal CLK may be 3 MHz when transmitting from control data to the light-emitting chips 400, and the frequency of the clock signal CLK may be 30 MHz when transmitting image data to the light-emitting chips 400, as mentioned above. The synchronization signal generation unit 731 outputs the clock signal CLK to the control data transmission unit 732, the image data transmission unit 735, and the printed circuit board 202.

When the first trigger signal TOP is input from the main processor 700, the synchronization signal generation unit 731 outputs, to the second CPU 720, a second trigger signal P_TOP indicating a timing of starting transmission of the input image data, and starts providing the synchronization signal. Specifically, the synchronization signal generation unit 731 generates the second synchronization signal P_SYNC indicating a cycle corresponding to the rotation speed of the photosensitive member 102, which is set in accordance with the sheet type used in a print job. The cycle indicated by the second synchronization signal P_SYNC is equal to the time length required for the photosensitive member 102 to rotate for one pixel. In addition, the synchronization signal generation unit 731 generates the first synchronization signal SYNC that is synchronized with the second synchronization signal P_SYNC but indicates constant line cycles independent of the rotation speed of the photosensitive member 102.

As an example, it is assumed that plain paper is selected in a first print job. In this case, the rotation speed of the photosensitive member 102 is set to the first rotation speed $P_1$. The line cycle of the second synchronization signal P_SYNC generated by the synchronization signal generation unit 731 is, for example, equal to 105.8 [μs], and the line cycle of the first synchronization signal SYNC is also equal to 105.8 [μs]. As another example, it is assumed that thick paper, whose basis weight is larger than plain paper, is selected in a second print job. In this case, the rotation speed of the photosensitive member 102 is set to the second rotation speed $P_2$, which is half of the first rotation speed $P_1$. The line cycle of the second synchronization signal P_SYNC generated by the synchronization signal generation unit 731 is, for example, equal to 211.6 [μs]. Meanwhile, the line cycle of the first synchronization signal SYNC is equal to 105.8 [μs], which is the same as that of the first print job. When the resolution in the sub-scanning direction is 1200 dpi (approximately 21.16 μm), the first rotation speed $P_1$ may correspond to the circumferential speed 200 [mm/s] of the photosensitive member 102, and the second rotation speed $P_2$ may correspond to the circumferential speed 100 [mm/s] of the photosensitive member 102.

The second synchronization signal P_SYNC is output to the second CPU 720 and used to control the rotation of the photosensitive member 102 and transport of the sheet using the transfer belt 111. The first synchronization signal SYNC is output to the signal selection unit 734 and the image data transmission unit 735 and used to control transmission of data signals to the light-emitting chip 400 line by line.

When control data is to be written to the register 1002 of each light-emitting chip 400 of the printed circuit board 202, the control data transmission unit 732 transmits a control signal for writing the control data to the printed circuit board 202 in response to an instruction from the register access unit 714. Here, the instruction from the register access unit 714 is constituted by a chip designation signal CHIP_E, an address designation signal ADD, and control data $D_{CTRL}$. For example, the chip designation signal CHIP_E is a 5-bit signal that designates the light-emitting chip 400 to which data is to be written. The address designation signal ADD is a 4-bit signal that designates a write destination address. The control data $D_{CTRL}$ is 8-bit data to be written to the designated address in the designated light-emitting chip 400. For example, when the chip designation signal CHIP_E indicates "1", the control data transmission unit 732 transmits the designated address and the control data in the signal format described using FIG. 7 to the control signal line for the light-emitting chip 400-1. Transmission of control data for the light-emitting chips 400-2 to 400-20 is also performed in the same manner.

The data buffer 733 is a line memory (e.g., SRAM) capable of buffering image data of two lines out of image data $B_{DATA}$ in bitmap format generated by the image data generation unit 713. The input and output of image data via the data buffer 733 will be described below in detail.

The signal selection unit 734 selectively outputs to the image data transmission unit 735 either a data signal based on the image data $M_{DATA}$ input from the data buffer 733 or a non-light-emission signal, for each line cycle indicated by the first synchronization signal SYNC. The data signal here includes a series of bits constituting the image data DATA1 to DATA20 described with reference to FIG. 8, where, for example, "1" indicates light emission of a corresponding light-emitting element 602, and "0" indicates non-light emission of a corresponding light-emitting element 602. Meanwhile, the non-light-emission signal is a signal for not causing a corresponding light-emitting element 602 to emit light, and is fixed to "0" regardless of the pixel position.

The first CPU 711 controls the selection of a signal $C_{DATA}$ to be output from the signal selection unit 734 to the image data transmission unit 735 for each line cycle indicated by the first synchronization signal SYNC, in accordance with the rotation speed setting of the photosensitive member 102. For example, when the photosensitive member 102 rotates at the first rotation speed, the signal selection unit 734 selects a data signal based on input image data from the data buffer 733 in all line cycles indicated by the first synchronization signal SYNC. On the other hand, when the photosensitive member 102 rotates at the second rotation speed that is 1/N of the first rotation speed, the signal selection unit 734 selects data signals based on the input image data in one line cycle out of N line cycles, and selects non-light-emission signals in the remaining line cycles.

The image data transmission unit 735 transmits the first synchronization signal SYNC to the printed circuit board 202 via the synchronization signal line. Further, during the line cycle indicated by the first synchronization signal SYNC, the image data transmission unit 735 transmits data signals of one line used for light emission control of a plurality of light-emitting elements 602 in parallel to the light-emitting chips 400-1 to 400-20 via twenty data signal lines. The image data transmission unit 735 may also include a data buffer for serial-to-parallel conversion.

<4-2. Example of Data Processing Timing>

(1) In Case of Normal Process Speed

Figure 14:
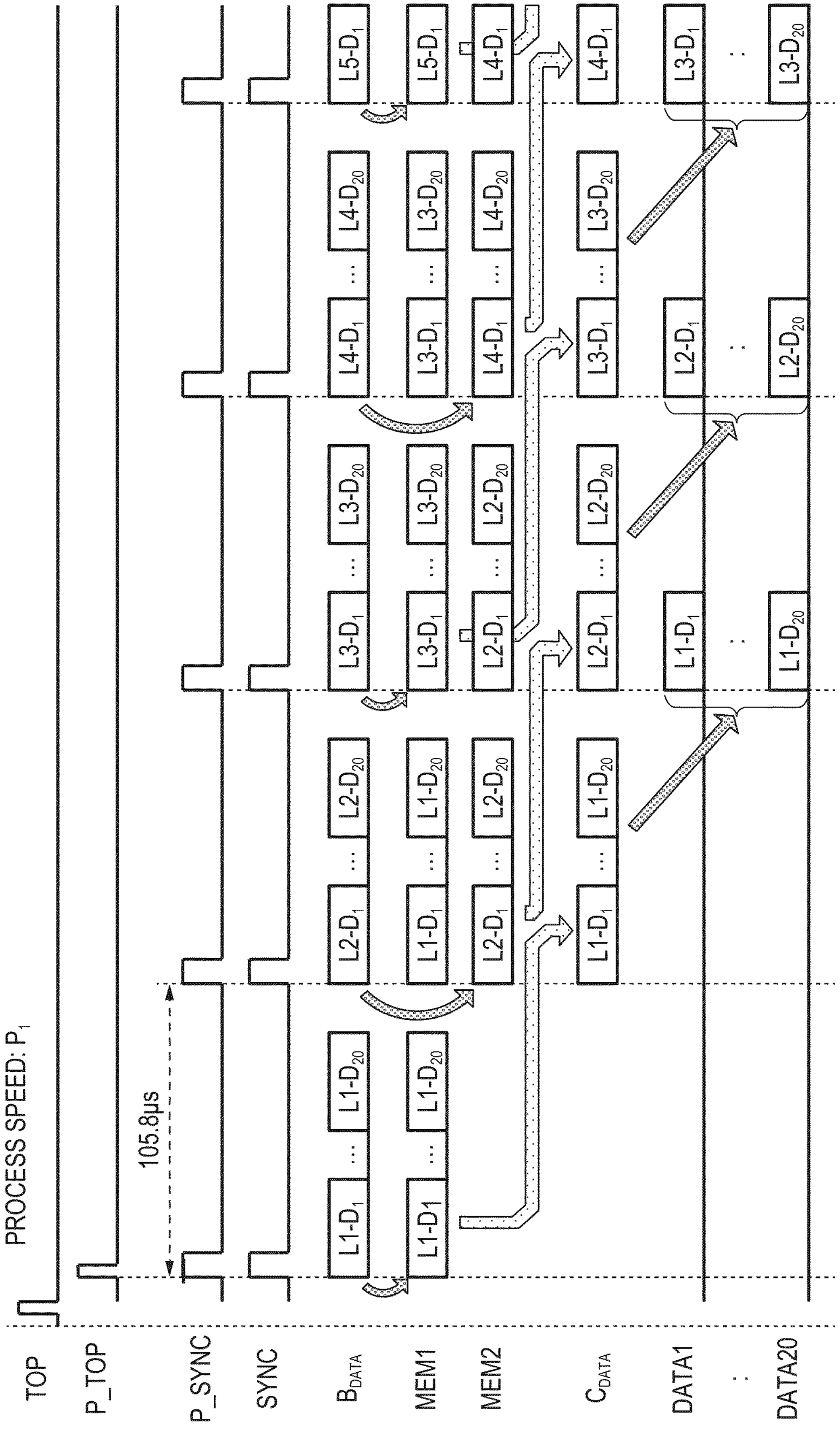
FIG. 14 is a signal chart showing an example of the timing of processing image data when the process speed is set to a normal value.

FIG. 14 is a signal chart showing an example of the timing of processing image data at the data communication unit 715. Here, the process speed is set to a normal value, i.e., the rotation speed of the photosensitive member 102 is the first rotation speed $P_1$ (e.g., printing on plain paper).

The first trigger signal TOP in the uppermost row in FIG. 14 is a pulse signal input from the main processor 700 to the synchronization signal generation unit 731 and indicates operation start timing of the image-making unit 103. The pulse width of the first trigger signal TOP may correspond to one cycle of the clock signal CLK. The fixing unit 104 and the transport unit 105 also start operating in accordance with the operation start timing indicated by the first trigger signal TOP so that the image-forming position in the sub-scanning direction is aligned with an appropriate position on the sheet.

The second trigger signal P_TOP in the second row is a pulse signal output from the synchronization signal generation unit 731 to the second CPU 720 and indicates operation start timing of respective parts of the image-forming unit 101. The pulse width of the first trigger signal TOP may correspond to one cycle of the clock signal CLK. The photosensitive member 102 and the transfer belt 111 start operating in accordance with the operation start timing indicated by the second trigger signal P_TOP.

The roles of the second synchronization signal P_SYNC in the third row and the first synchronization signal SYNC in the fourth row are as described above. Here, these two synchronization signals indicate the same line cycle (105.8 μs), and are at a high level at the beginning of the transmission timing for each line of the image data. Since the second trigger signal P_TOP, the first synchronization signal SYNC, and the second synchronization signal P_SYNC are synchronized with each other, the image-forming position in the main scanning direction can be aligned with an appropriate position on the sheet.

The fifth row indicates image data $B_{DATA}$ input from the image data generation unit 713 to the data buffer 733. The sixth and seventh rows indicate data stored in a first line area (MEM1) and a second line area (MEM2) of the data buffer 733, respectively. In a first line cycle for each page, image data L1-$D_1$, . . . , L1-$D_{20}$ for a first line is stored in the first line area of the data buffer 733. In a second line cycle for each page, image data L2-$D_1$, . . . , L2-$D_{20}$ for a second line is stored in the second line area of the data buffer 733. In a third line cycle for each page, image data L3-$D_1$, . . . , L3-$D_{20}$ for a third line is stored in (written over) the first line area of the data buffer 733. In a fourth line cycle for each page, image data L4-$D_1$, . . . , L4-$D_{20}$ for a fourth line is stored in (written over) the second line area of the data buffer 733. Similarly, during the fifth and subsequent line cycles, image data in odd-numbered lines and image data in even-numbered lines are alternately stored in the first and second line areas, respectively, of the data buffer 733.

The eighth row indicates data signal $C_{DATA}$ output from the signal selection unit 734 to the image data transmission unit 735. In the scenario of FIG. 14, the rotation speed of the photosensitive member 102 is the first rotation speed. Thus, the signal selection unit 734 selects data signals based on the input image data from the data buffer 733 during all the line cycles indicated by the first synchronization signal SYNC. Thus, during the second line cycle, the signal selection unit 734 outputs data signals based on the image data L1-$D_1$, . . . , L1-$D_{20}$ for the first line, to the image data transmission unit 735. Next, during the third line cycle, the signal selection unit 734 outputs data signals based on the image data L2-$D_1$, . . . , L2-$D_{20}$ for the second line, to the image data transmission unit 735. Next, during the fourth line cycle, the signal selection unit 734 outputs data signals based on the image data L3-$D_1$, . . . , L3-$D_{20}$ for the third line, to the image data transmission unit 735. Similarly, during the fifth and subsequent line cycles, data signals for the fourth and subsequent lines are output in sequence to the image data transmission unit 735.

The ninth and tenth rows indicate data signal DATA1 to DATA20 transmitted from the image data transmission unit 735 to the printed circuit board 202. During each of the third and subsequent line cycles, the image data transmission unit 735 transmits in parallel, to the printed circuit board 202, data signals for twenty light-emitting chips 400 that were received from the signal selection unit 734 and buffered during the previous line cycle. For example, data signals based on the image data L1-$D_1$, . . . , L1-$D_{20}$ for the first line are transmitted in parallel during the third line cycle, and data signals based on the image data L2-$D_1$, . . . , L2-$D_{20}$ for the second line are transmitted in parallel during the fourth line cycle.

(2) In Case of 1/N Process Speed

The signal chart of FIG. 14 shows the processing timing when the process speed is set to a normal value, and no non-light-emission signal appears in this chart. In contrast, when the process speed is set to 1/N of the normal value, a non-light-emission signal is inserted between normal data signals.

Figure 15:
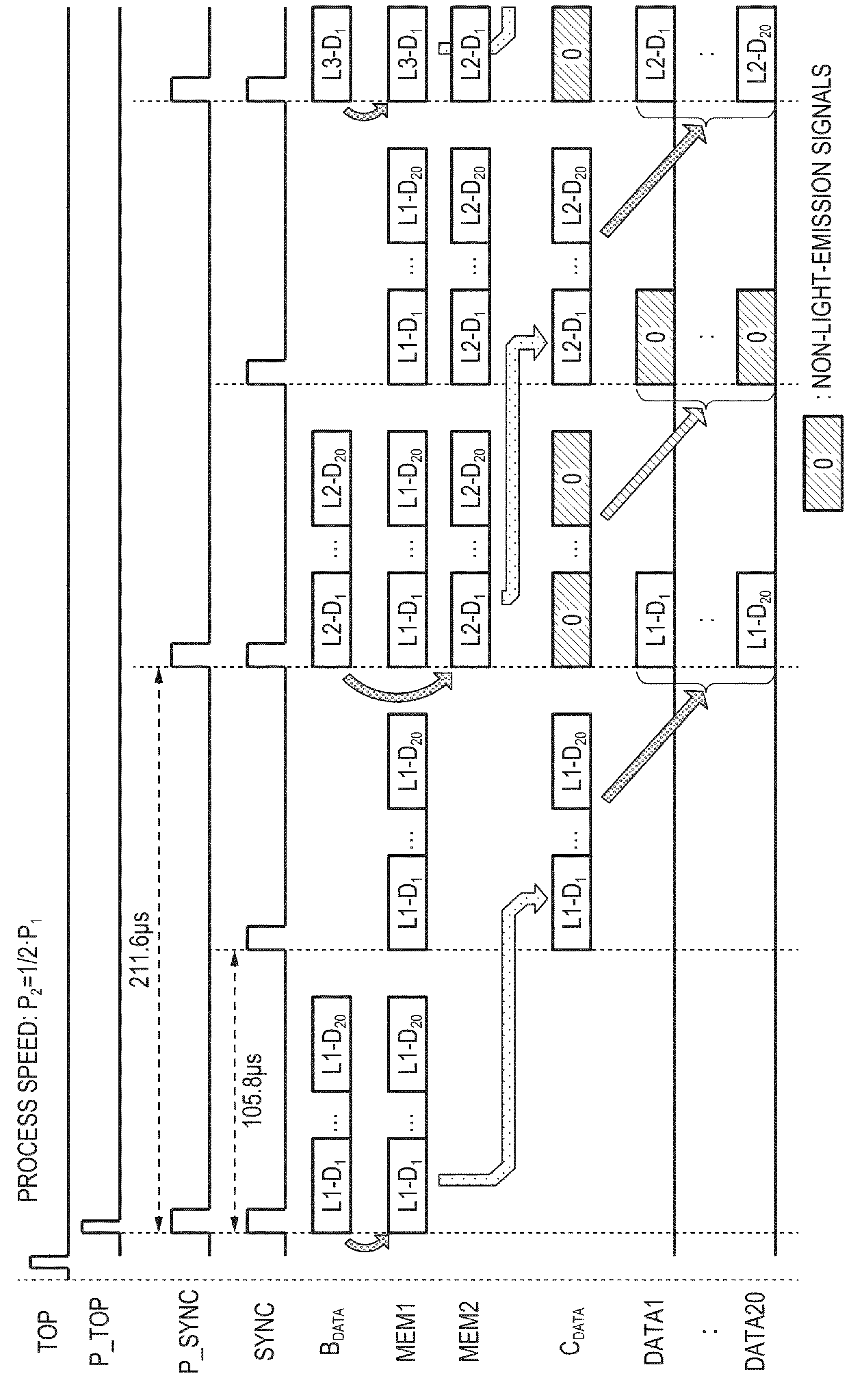
FIG. 15 is a signal chart showing an example of the timing of processing image data when the process speed is set to ½ of the normal value.

FIG. 15 is a signal chart showing another example of the timing of processing image data at the data communication unit 715. Here, the process speed is set to ½ of the normal value, i.e., the rotation speed of the photosensitive member 102 is the second rotation speed $P_2$ (=$P_1$/2) (e.g., printing on thick paper).

The first trigger signal TOP in the uppermost row and the second trigger signal P_TOP in the second row in FIG. 15 are the same as those in the example of FIG. 14.

The second synchronization signal P_SYNC in the third row indicates a cycle (211.6 μs) that is twice the cycle in the example of FIG. 14 since the rotation speed of the photosensitive member 102 is the second rotation speed $P_2$ here. Meanwhile, the first synchronization signal SYNC in the fourth row indicates the same cycle (105.8 μs) as that in the example in FIG. 14 without depending on the rotation speed of the photosensitive member 102. In the following description, the term "line cycle" refers to a cycle indicated by the first synchronization signal SYNC.

As is understood from the timing of processing the image data $B_{DATA}$ in the fifth row, the image data from the image data generation unit 713 is stored in the data buffer 733 in the cycles indicated by the second synchronization signal P_SYNC. That is, in the first line cycle indicated by the first synchronization signal SYNC, the image data L1-$D_1$, . . . , L1-$D_{20}$ for the first line are stored in the first line area (MEM1) of the data buffer 733 in response to the first rise of the second synchronization signal P_SYNC. In the second line cycle, new image data is not stored in the data buffer 733. In the third line cycle, the image data L2-$D_1$, . . . , L2-$D_{20}$ for the second line is stored in the second line area (MEM2) of the data buffer 733 in response to the second rise of the second synchronization signal P_SYNC. In the fourth line cycle, new image data is not stored in the data buffer 733.

Focusing on the eighth row, here, the rotation speed of the photosensitive member 102 is the second rotation speed, which is ½ of the first rotation speed. Thus, the signal selection unit 734 selects data signals based on input image data during one line cycle out of two line cycles, and selects non-light-emission signals during the remaining line cycle. Accordingly, during the second line cycle, the signal selection unit 734 outputs data signals based on the image data L1-$D_1$, . . . , L1-$D_{20}$ in the first line, to the image data transmission unit 735. Next, during the third line cycle, the signal selection unit 734 selects non-light-emission signals for all the light-emitting elements 602 of all the light-emitting chips 400 and outputs these non-light-emission signal (a sequence of "0" bits) to the image data transmission unit 735. Similarly, during the fourth and subsequent line cycles, the signal selection unit 734 outputs, to the image data transmission unit 735, data signals based on input image data during even-numbered line cycles, and outputs non-light-emission signals during odd-numbered line cycles.

Focusing on the ninth and tenth rows, during the third line cycle, the image data transmission unit 735 transmits data signals based on the image data L1-$D_1$, . . . , L1-$D_{20}$ in the first line to the printed circuit board 202 in parallel for twenty light-emitting chips 400. Next, during the fourth line cycle, the image data transmission unit 735 transmits non-light-emission signals for twenty light-emitting chips 400 in parallel to the printed circuit board 202. Similarly, during the fifth and subsequent line cycles, the signal selection unit 734 transmits, to the printed circuit board 202, data signals based on input image data during odd-numbered line cycles, and non-light-emission signals during even-numbered line cycles. Note that the image data transmission unit 735 simply repeats the operation of parallelizing input signals from the signal selection unit 734 and transmitting the resulting signals to the printed circuit board 202 during each line cycle, and does not need to be aware of whether each signal being transmitted is a signal based on input image data or a dummy non-light-emission signal. Similarly, the light-emitting chips 400-1 to 400-20 of the receiving-side printed circuit board 202 need only drive corresponding light-emitting elements 602 in accordance with respective values, without being aware of whether each received signal is based on input image data or is a dummy non-light-emission signal.

Figure 16:
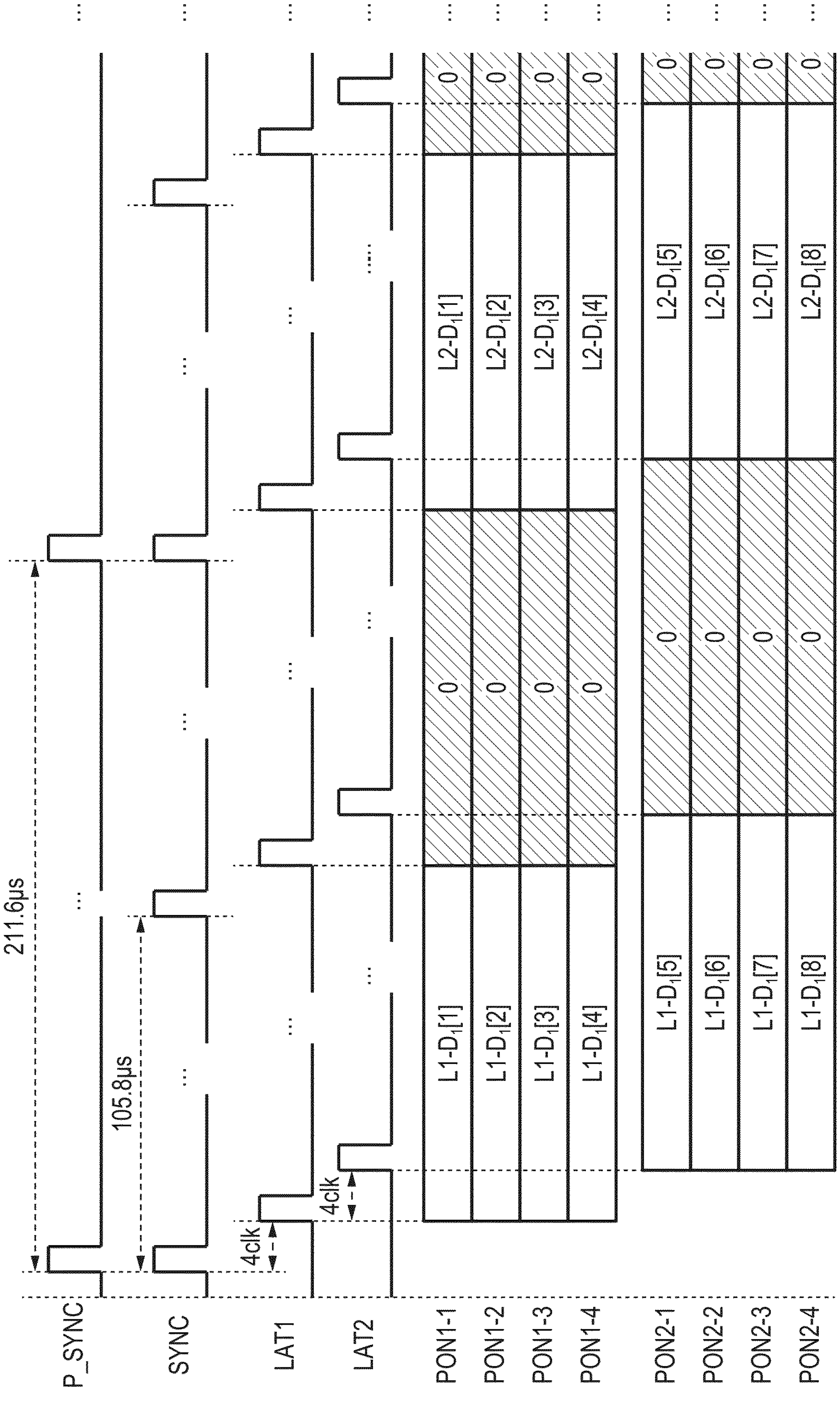
FIG. 16 is a signal chart related to the timing of outputting a drive signal to the current drive unit in the example shown in FIG. 15.

FIG. 16 is a signal chart related to the timing of outputting a drive signal from each latch unit to the current drive unit, corresponding to the example of FIG. 15.

Similar to the example of FIG. 12, the cycle of the second synchronization signal P_SYNC shown in the uppermost row in FIG. 16 is approximately 211.6 (=105.8×2) μs since the process speed is set to ½. The cycle of the first synchronization signal SYNC shown in the second row is a constant line cycle that does not depend on the rotation speed of the photosensitive member 102, namely 105.8 μs.

The cycle of the first latch signal LAT1 shown in the third row is the same as the cycle of the first synchronization signal SYNC, but the timing of the rise of the first latch signal LAT1 is four clocks later than the first synchronization signal SYNC. The cycle of the second latch signal LAT2 shown in the fourth row is the same as the cycle of the first synchronization signal SYNC, but the timing of the rise of the second latch signal LAT2 is four clocks later than the first latch signal LAT1.

The forwarding unit 1003 of the light-emitting chip 400-1 receives image data L1-$D_1$[1] to L1-$D_1$ in sequence during the first line cycle. Starting from the rise of the first latch signal LAT1, the latch unit 1004-001 outputs in parallel four drive signals based on the image data L1-$D_1$[1] to L1-$D_1$[4] to the signal lines PON1-1 to PON1-4. The output of these drive signals is maintained until the next rise of the first latch signal LAT1 (i.e., over the time length of one line cycle). Starting from the rise of the second latch signal LAT2, the latch unit 1004-002 outputs in parallel four drive signals based on the image data L1-$D_1$[5] to L1-$D_1$[8] to signal lines PON2-1 to PON2-4. The output of these drive signals is maintained until the next rise of the second latch signal LAT2. Drive signals from the latch units 1004-003 to 1004-748 are output in the same manner.

Next, during the second the line cycle, the forwarding unit 1003 receives 2992 non-light-emission signals in sequence.

Starting from the second rise of the first latch signal LAT1, the latch unit 1004-001 outputs in parallel four drive signals corresponding to the non-light-emission signals to the signal lines PON1-1 to PON1-4. Starting from the second rise of the second latch signal LAT2, the latch unit 1004-002 outputs in parallel four drive signals corresponding to the non-light-emission signals to the signal lines PON2-1 to PON2-4. Drive signals from the latch units 1004-003 to 1004-748 are output in the same manner.

Next, during the third line cycle, the forwarding unit 1003 receives image data L2-$D_1$[1] to L2-$D_1$ in sequence. Starting from the third rise of the first latch signal LAT1, the latch unit 1004-001 outputs in parallel four drive signals based on the image data L2-$D_1$[1] to L2-$D_1$[4] to the signal lines PON1-1 to PON1-4. Starting from the third rise of the second latch signal LAT2, the latch unit 1004-002 outputs in parallel four drive signals based on the image data L2-$D_1$[5] to L2-$D_1$[8] to the signal lines PON2-1 to PON2-4. Drive signals from the latch units 1004-003 to 1004-748 are output in the same manner.

Thus, in the example of FIG. 16, each light-emitting chip 400-*n* maintains, in a light-emitting state, light-emitting elements 602 that are indicated to emit light by input data signals through one out of two line cycles, and causes none of the light-emitting elements 602 to emit light through the remaining line cycle. This avoids excessive exposure illustrated with reference to FIG. 12. As a result, stable-quality images can be formed on various types of sheets, regardless of the process speed setting.

The change ratio of the process speed is not limited to the above example of N=2. In the following, an example will be described in which excessive exposure is prevented using the same principle in the case where the process speed is set to ⅓ of the normal value (i.e., N=3).

Figure 17:
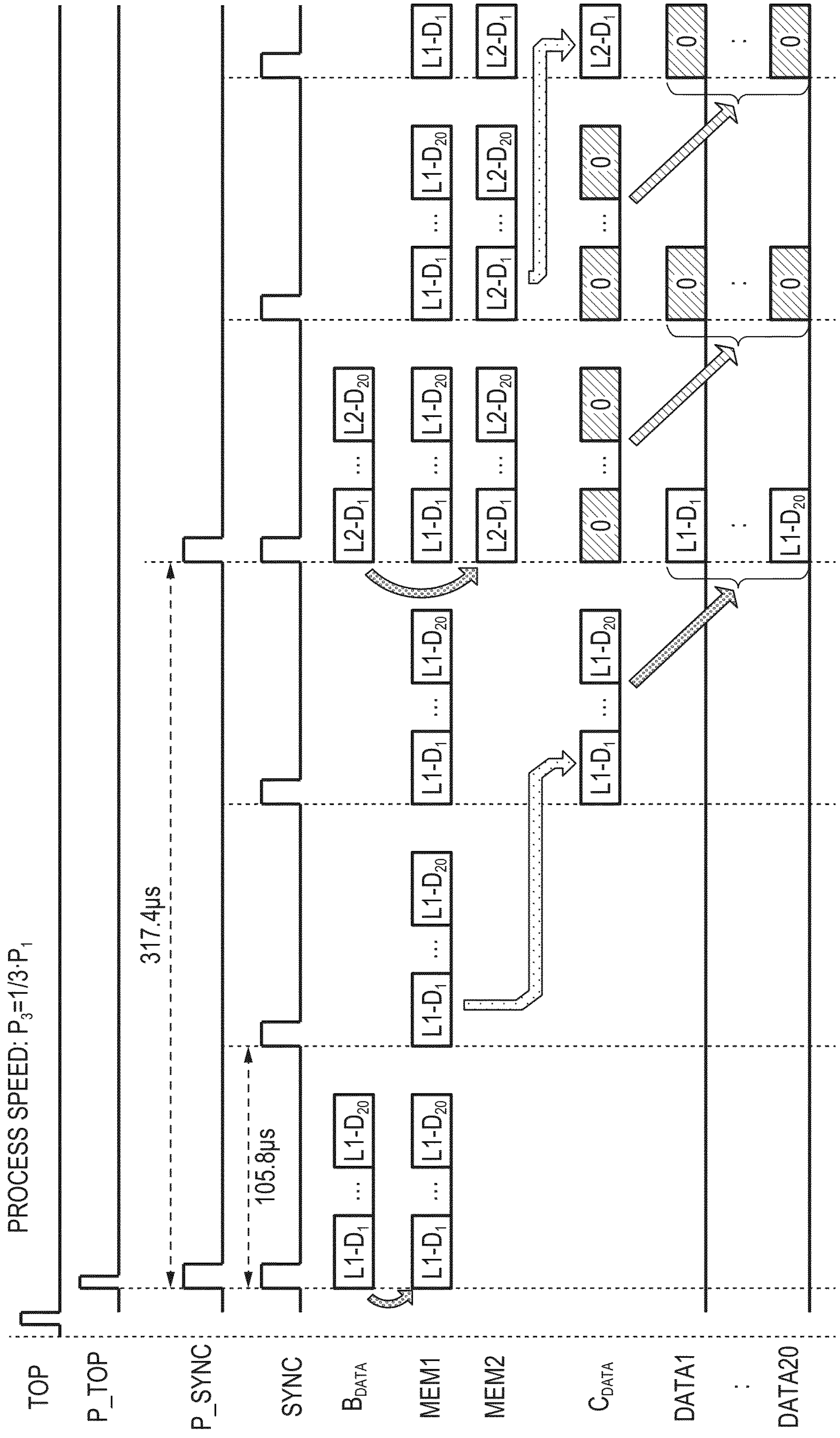
FIG. 17 is a signal chart showing an example of the timing of processing image data when the process speed is set to ⅓ of the normal value.

FIG. 17 is a signal chart showing an example of the timing of processing image data at the data communication unit 715. Here, the process speed is set to ⅓ of the normal value, i.e., the rotation speed of the photosensitive member 102 is a third rotation speed $P_3$ (=$P_1$/3). When the resolution in the sub-scanning direction is 1200 dpi and the first rotation speed $P_1$ corresponds to the circumferential speed 200 [mm/s] of the photosensitive member 102, the third rotation speed $P_3$ may correspond to the circumferential speed 66.67 [mm/s] of the photosensitive member 102.

The first trigger signal TOP in the uppermost row and the second trigger signal P_TOP in the second row in FIG. 17 are the same as those in the example of FIG. 14.

The second synchronization signal P_SYNC in the third row indicates a cycle (317.4 μs) that is three times the cycle in the example of FIG. 14 since the rotation speed of the photosensitive member 102 is the third rotation speed $P_3$ here. Meanwhile, the first synchronization signal SYNC in the fourth row indicates the same cycle (105.8 μs) as that in the example in FIG. 14 without depending on the rotation speed of the photosensitive member 102. In the following description, the term "line cycle" refers to a cycle indicated by the first synchronization signal SYNC.

Referring to the fifth row, image data from the image data generation unit 713 is stored in the data buffer 733 in a cycle indicated by the second synchronization signal P_SYNC. That is, in the first line cycle indicated by the first synchronization signal SYNC, image data L1-$D_1$, . . . , L1-$D_{20}$ for the first line are stored in the first line area (MEM1) of the data buffer 733 in response to the first rise of the second synchronization signal P_SYNC. In the second and third line cycles, new image data is not stored in the data buffer 733. In the fourth line cycle, image data L2-$D_1$, . . . , L2-$D_{20}$ for the second line is stored in the second line area (MEM2) of the data buffer 733 in response to the second rise of the second synchronization signal P_SYNC. In the fourth and fifth line cycles, new image data is not stored in the data buffer 733.

Focusing on the eighth row, here, the rotation speed of the photosensitive member 102 is the third rotation speed, which is ⅓ of the first rotation speed. Thus, the signal selection unit 734 selects data signals based on input image data in one out of three line cycles, and selects non-light-emission signals in the remaining two line cycles. Accordingly, during the third line cycle, the signal selection unit 734 outputs data signals based on the image data L1-$D_1$, . . . , L1-$D_{20}$ in the first line, to the image data transmission unit 735. Next, during the fourth line cycle, the signal selection unit 734 selects non-light-emission signals for all the light-emitting elements 602 of all the light-emitting chips 400 and outputs these non-light-emission signals to the image data transmission unit 735. Next, during the fifth line cycle, the signal selection unit 734 again selects non-light-emission signals for all the light-emitting elements 602 of all the light-emitting chips 400 and outputs these non-light-emission signals to the image data transmission unit 735. Similarly, during the sixth and subsequent line cycles, the signal selection unit 734 outputs, to the image data transmission unit 735, data signals based on the input image data during one out of three line cycles, and outputs the non-light-emission signals during the remaining two line cycles.

Focusing on the ninth and tenth rows, during the fourth line cycle, the image data transmission unit 735 transmits data signals based on the image data L1-$D_1$, . . . , L1-$D_{20}$ for the first line to the printed circuit board 202 in parallel for twenty light-emitting chip 400. Next, during the fifth line cycle, the image data transmission unit 735 transmits, to the printed circuit board 202, non-light-emission signals for twenty light-emitting chips 400 in parallel. Next, during the sixth line cycle, the image data transmission unit 735 again transmits, to the printed circuit board 202, non-light-emission signals for twenty light-emitting chips 400 in parallel. Although not shown in the figure, during the seventh line cycle, the image data transmission unit 735 transmits, to the printed circuit board 202, data signals based on the image data L2-$D_1$, . . . , L2-$D_{20}$ for the second line for twenty light-emitting chips 400 in parallel. Note that, here as well, the image data transmission unit 735 does not need to be aware of whether each signal being transmitted is based on input image data or is a dummy non-light-emission signal. Similarly, the light-emitting chips 400-1 to 400-20 need only drive corresponding light-emitting elements 602 in accordance with respective values, without being aware of whether each received signal is based on input image data or is a dummy non-light-emission signal.

Figure 18:
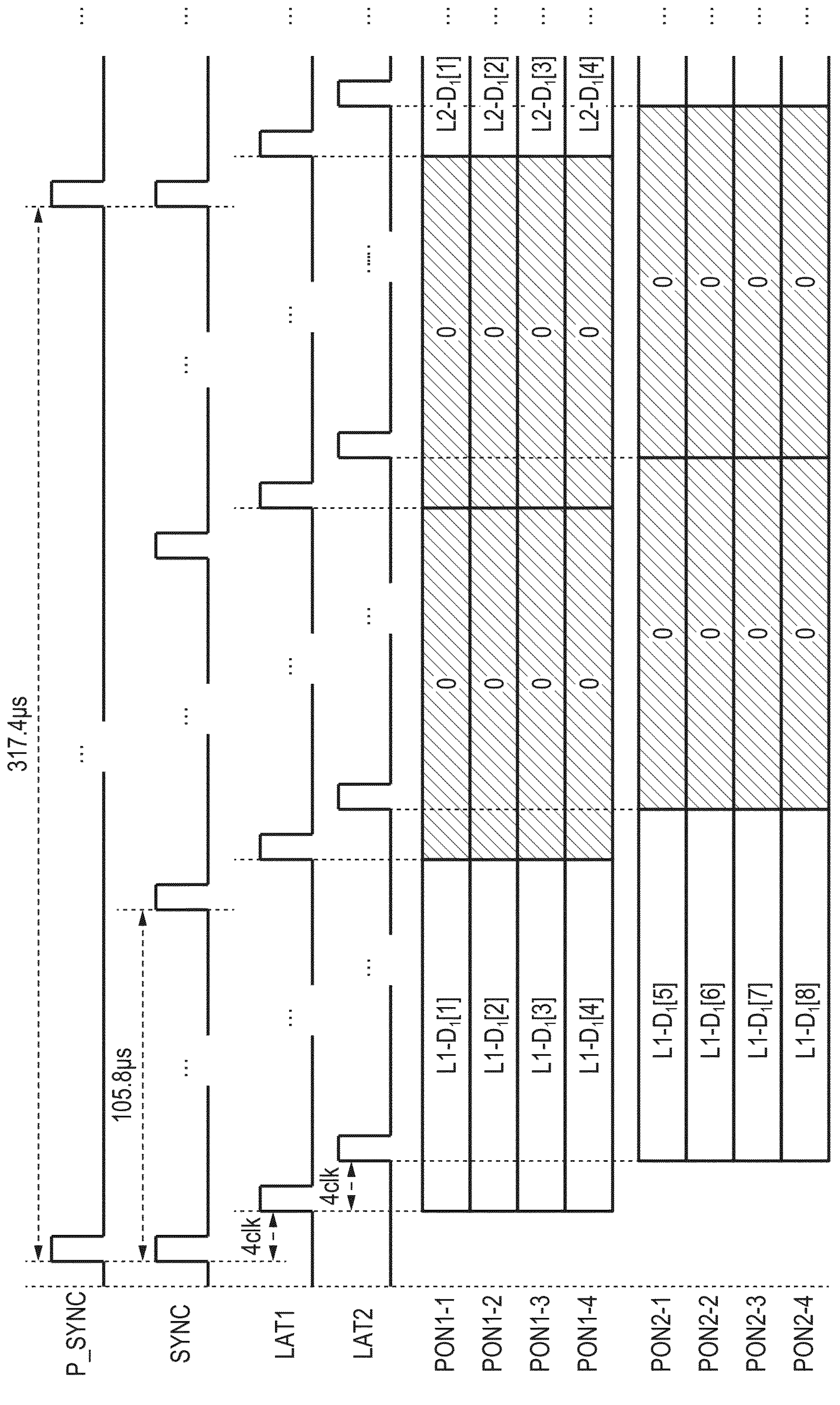
FIG. 18 is a signal chart related to the timing of outputting a drive signal to the current drive unit in the example shown in FIG. 17.

FIG. 18 is a signal chart related to the timing of outputting a drive signal from each latch unit to the current drive unit, corresponding to the example of FIG. 17.

Since the process speed is set to ⅓, the cycle of the second synchronization signal P_SYNC shown in the uppermost row in FIG. 18 is approximately 317.4 (=105.8×3) μs. The cycle of the first synchronization signal SYNC shown in the second row is a constant line cycle that does not depend on the rotation speed of the photosensitive member 102, namely 105.8 μs.

The cycle of the first latch signal LAT1 shown in the third row is the same as the cycle of the first synchronization signal SYNC, but the timing of the rise of the first latch signal LAT1 is four clocks later than the first synchronization signal SYNC. The cycle of the second latch signal LAT2 shown in the fourth row is the same as the cycle of the first synchronization signal SYNC, but the timing of the rise of the second latch signal LAT2 is four clocks later than the first latch signal LAT1.

The forwarding unit 1003 of the light-emitting chip 400-1 receives image data L1-$D_1$[1] to L1-$D_1$ in sequence during the first line cycle. Starting from the rise of the first latch signal LAT1, the latch unit 1004-001 outputs in parallel four drive signals based on the image data L1-$D_1$[1] to L1-$D_1$[4] to the signal lines PON1-1 to PON1-4. Starting from the rise of the second latch signal LAT2, the latch unit 1004-002 outputs in parallel four drive signals based on the image data L1-$D_1$[5] to L1-$D_1$[8] to signal lines PON2-1 to PON2-4. Drive signals from the latch units 1004-003 to 1004-748 are output in the same manner.

Next, during the second the line cycle, the forwarding unit 1003 receives 2992 non-light-emission signals in sequence. Starting from the second rise of the first latch signal LAT1, the latch unit 1004-001 outputs in parallel four drive signals corresponding the non-light-emission signals to the signal lines PON1-1 to PON1-4. Starting from the second rise of the second latch signal LAT2, the latch unit 1004-002 outputs in parallel four drive signals corresponding to the non-light-emission signals to the signal lines PON2-1 to PON2-4. Drive signals from the latch units 1004-003 to 1004-748 are output in the same manner.

During the third line cycle, the forwarding unit 1003 also receives 2992 non-light-emission signals in sequence. Starting from the third rise of the first latch signal LAT1, the latch unit 1004-001 outputs in parallel four drive signals corresponding the non-light-emission signals to the signal lines PON1-1 to PON1-4. Starting from the third rise of the second latch signal LAT2, the latch unit 1004-002 outputs in parallel four drive signals corresponding to the non-light-emission signals to the signal lines PON2-1 to PON2-4. Drive signals from the latch units 1004-003 to 1004-748 are output in the same manner.

During the fourth line cycle, the forwarding unit 1003 receives image data L2-$D_1$[1] to L2-$D_1$ in sequence. Starting from the fourth rise of the first latch signal LAT1, the latch unit 1004-001 outputs in parallel four drive signals based on the image data L2-$D_1$[1] to L2-$D_1$[4] to the signal lines PON1-1 to PON1-4. Starting from the fourth rise of the second latch signal LAT2, the latch unit 1004-002 outputs in parallel four drive signals based on the image data L2-$D_1$[5] to L2-$D_1$[8] to the signal lines PON2-1 to PON2-4. Drive signals from the latch units 1004-003 to 1004-748 are output in the same manner.

Thus, in the example of FIG. 18, each light-emitting chip 400-*n* maintains, in a light-emitting state, light-emitting elements 602 that are indicated to emit light by input data signals through one out of three line cycles, and causes none of the light-emitting elements 602 to emit light through the remaining line cycles. This avoids the aforementioned excessive exposure, and consequently, stable-quality images can be formed on various types of sheets without being affected by the process speed setting.

With the configuration of the exposure head 106 according to the above-described embodiment, even when the process speed is variably set, excessive exposure of the photosensitive member 102 can be avoided without affecting the configuration of the plurality of light-emitting chips 400 of the printed circuit board 202. Therefore, as there is no need to incorporate complex circuits into the light-emitting chips 400 for drive control of the light-emitting elements 602, the manufacturing and development costs of the image-forming apparatus 1 and the exposure head 106 can be reduced, and the miniaturization of the device can be promoted. In addition, the above-described insertion of non-light emission signals into the signal sequence of the image data is achieved by simple signal selection based on the progression of the line cycles. Therefore, no extra hardware needs to be added to the image controller 710, which can further reduce costs.

(3) Other Process Speeds

The rotation speed of the photosensitive member 102 may be set to a value other than 1/N of the normal value depending on the sheet type (or other factors). In a first variation, it is assumed the photosensitive member 102 rotates at a rotation speed $P_4$, which is M/N of the rotation speed $P_1$. Here, M is an integer that satisfies $1<M<N$. In this case, the second synchronization signal P_SYNC indicates a cycle that is N/M of the line cycle corresponding to the rotation speed $P_1$. The synchronization signal generation unit 731 generates a first synchronization signal SYNC indicating a line cycle that is the same as the line cycle corresponding to the rotation speed $P_1$, even when the photosensitive member rotates at the rotation speed $P_4$. The image data transmission unit 735 iteratively transmits data signals of one line to the light-emitting chips 400-1 to 400-20 during M line cycles out of N line cycles indicated by the first synchronization signal SYNC when the photosensitive member 102 rotates at the rotation speed $P_4$. That is, in this case, data signals in the same line are repeatedly transmitted for M line cycles. Further, the image data transmission unit 735 transmits non-light-emission signals for causing none of the light-emitting elements 602 to emit light to the light-emitting chips 400-1 to 400-20 during the remaining line cycles out of the N line cycles. By switching between data signals and non-light-emission signals as in the first variation, the amount of exposure at each pixel position on each line can be reduced to M/N of the amount of exposure when the non-light-emission signals are not inserted, thereby avoiding excessive exposure.

In a second variation, it is assumed the photosensitive member 102 rotates at a rotation speed $P_5$, which is M/N of the rotation speed $P_1$. Here, M may be any positive number. In the second variation, each light-emitting chip 400 is set so as to emit light with an amount of light that is M times the normal amount of light. The second synchronization signal P_SYNC indicates a cycle that is N times the line cycle corresponding to the rotation speed $P_1$. The synchronization signal generation unit 731 generates a first synchronization signal SYNC indicating a line cycle that is the same as the line cycle corresponding to the rotation speed $P_1$, even when the photosensitive member rotates at the rotation speed $P_5$. The image data transmission unit 735 transmits data signals of one line to the light-emitting chips 400-1 to 400-20 during one out line cycle out of N line cycles indicated by the first synchronization signal SYNC when the photosensitive member 102 rotates at the rotation speed $P_5$. Further, the image data transmission unit 735 transmits non-light-emission signals for causing none of the light-emitting elements 602 to emit light to the light-emitting chips 400-1 to 400-20 during the remaining line cycles out of the N line cycles. Prior to starting the image-forming operation, the control data transmission unit 732 writes to the register 1002 of each light-emitting chip 400 control data indicating a current setting value that is M times the current setting value when the photosensitive member 102 rotates at the rotation speed $P_1$. Combining signal output control and variable current settings as in the second variation can also reduce the amount of exposure at each pixel position in each line to M/N, thereby avoiding excessive exposure.

5. Further Variations

Although specific numerical values are used herein for description, these specific numerical values are merely examples, and the present disclosure is not limited to the specific numerical values used herein. Specifically, the number of light-emitting chips provided on one printed circuit board is not limited to twenty, and may be any number. The size of the light-emitting element array in each light-emitting chip 400 is not limited to four rows×748 columns, and may be any other size. The pitches of the light-emitting elements in the circumferential direction and the axial direction are not limited to approximately 21.16 μm and approximately 5 μm, respectively, and may take any other values. The number of signals grouped by each latch unit 1004 in the circuit portion 406 of each light-emitting chip 400 need not necessarily be four, and may alternatively be any other number.

The configuration of the data communication unit 715 is not limited to the above-described example either. For example, conversion of PDL data to binary input image data may be performed at any timing before signal output to the printed circuit board 202. Image data may be buffered using a line memory of three or more lines instead of a line memory of two lines.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-014304, filed on Feb. 1, 2024 which is hereby incorporated by reference herein in its entirety.

What is claimed is:

1. An exposure apparatus comprising:

at least one light-emitting chip having a plurality of light-emitting elements arranged along a line parallel with an axial direction of a photosensitive member that is configured to rotate;

a synchronization signal generation unit configured to generate a first synchronization signal synchronized with a second synchronization signal corresponding to a rotation speed of the photosensitive member, the first synchronization signal being used to control transmission of a data signal for each line to the at least one light-emitting chip; and a transmission unit configured to transmit, to the at least one light-emitting chip, a data signal of one line used for light emission control of the plurality of light-emitting elements, during a line cycle indicated by the first synchronization signal, wherein the second synchronization signal indicates a first line cycle when the photosensitive member rotates at a first rotation speed, and indicates a second line cycle that is N times the first line cycle (N is an integer, 1<N) when the photosensitive member rotates at a second rotation speed that is 1/N of the first rotation speed, the synchronization signal generation unit is configured to generate the first synchronization signal indicating the first line cycle regardless of the rotation speed of the photosensitive member, and when the photosensitive member rotates at the second rotation speed, the transmission unit is configured to:

transmit the data signal of one line to the at least one light-emitting chip during one line cycle out of N line cycles indicated by the first synchronization signal; and transmit a non-light-emission signal for not causing the plurality of light-emitting elements to emit light to the at least one light-emitting chip during remaining one or more line cycles out of the N line cycles.

2. The exposure apparatus according to claim 1, wherein, through each line cycle indicated by the first synchronization signal, the at least one light-emitting chip maintains a light-emitting element that is indicated to emit light by the data signal input during the line cycle in a light-emitting state.

3. The exposure apparatus according to claim 1, further comprising:

a data generation unit configured to generate image data used for light emission control of the plurality of light-emitting elements of the at least one light-emitting chip;

a signal selection unit configured to selectively output, to the transmission unit, either the data signal based on the image data generated by the data generation unit or the non-light-emission signal, for each line cycle indicated by the first synchronization signal; and a first control unit configured to control selection of a signal output from the signal selection unit to the transmission unit for each line cycle indicated by the first synchronization signal in accordance with a setting of the rotation speed of the photosensitive member.

4. The exposure apparatus according to claim 1, wherein, when the photosensitive member rotates at a third rotation speed that is M/N (M is an integer, 1<M<N) of the first rotation speed, the transmission unit is configured to:

iteratively transmit the data signal of one line to the at least one light-emitting chip during M line cycles out of the N line cycles indicated by the first synchronization signal; and transmit the non-light-emission signal for not causing the plurality of light-emitting elements to emit light to the at least one light-emitting chip, during the remaining one or more line cycles out of the N line cycles.

5. The exposure apparatus according to claim 1, wherein, when the photosensitive member rotates at a third rotation speed that is M/N of the first rotation speed, the transmission unit is configured to:

transmit the data signal of one line to the at least one light-emitting chip during the one line cycle out of the N line cycles indicated by the first synchronization signal; and transmit the non-light-emission signal for not causing the plurality of light-emitting elements to emit light to the at least one light-emitting chip during the remaining one or more line cycles out of the N line cycles, and when the photosensitive member rotates at the third rotation speed, the plurality of light-emitting elements of the at least one light-emitting chip are set so as to emit light whose amount is M times an amount of light emitted when the photosensitive member rotates at the first rotation speed.

6. The exposure apparatus according to claim 1, wherein the plurality of light-emitting elements are organic electro luminescence (EL) elements.

7. An image-forming apparatus comprising:

the exposure apparatus according to claim 1;

the photosensitive member;

a developer configured to develop a latent image formed as a result of the exposure apparatus exposing the photosensitive member, and form a toner image on a surface of the photosensitive member;

a fixing unit configured to fix, onto a sheet, the toner image transferred from the photosensitive member to the sheet; and a setting unit configured to set the rotation speed of the photosensitive member depending on a type of the sheet.

8. The image-forming apparatus according to claim 7, wherein the setting unit is configured to:

set the rotation speed of the photosensitive member to the first rotation speed when an image is formed on a sheet having a first basis weight; and set the rotation speed of the photosensitive member to the second rotation speed when an image is formed on a sheet having a second basis weight larger than the first basis weight.

9. The image-forming apparatus according to claim 7, wherein the synchronization signal generation unit is configured to generate the second synchronization signal indicating a line cycle corresponding to the rotation speed of the photosensitive member set by the setting unit.

10. The image-forming apparatus according to claim 9, further comprising:

a second control unit configured to synchronously control rotation of the photosensitive member and transport of the sheet based on the second synchronization signal generated by the synchronization signal generation unit.

* * * * *